(12) United States Patent
Ito et al.

(10) Patent No.: US 7,262,146 B2
(45) Date of Patent: *Aug. 28, 2007

(54) DIELECTRIC CERAMIC COMPOSITION AND ELECTRONIC DEVICE

(75) Inventors: Kazushige Ito, Chuo-ku (JP); Akira Sato, Chuo-ku (JP)

(73) Assignee: TDK Corporation, Tokyo (JP)

( * ) Notice: Subject to any disclaimer, the term of this patent is extended or adjusted under 35 U.S.C. 154(b) by 104 days.

This patent is subject to a terminal disclaimer.

(21) Appl. No.: 11/207,929

(22) Filed: Aug. 22, 2005

(65) Prior Publication Data

US 2006/0046922 A1  Mar. 2, 2006

(30) Foreign Application Priority Data

Aug. 30, 2004 (JP) .............................. 2004-250941
Jun. 9, 2005 (JP) .............................. 2005-169895

(51) Int. Cl.
*C04B 35/468* (2006.01)
*H01G 4/12* (2006.01)

(52) U.S. Cl. .................... 501/139; 501/138; 361/321.4

(58) Field of Classification Search ................ 501/137, 501/138, 139; 361/321.4
See application file for complete search history.

(56) References Cited

U.S. PATENT DOCUMENTS

| | | | | |
|---|---|---|---|---|
| 6,226,172 B1 * | 5/2001 | Sato et al. | ................... | 361/311 |
| 6,403,513 B1 * | 6/2002 | Sato et al. | ................... | 501/137 |
| 6,544,916 B1 * | 4/2003 | Sato et al. | ................... | 501/137 |
| 6,548,437 B2 * | 4/2003 | Sato et al. | ................... | 501/139 |
| 6,999,302 B2 * | 2/2006 | Ito et al. | ................... | 361/321.2 |
| 7,061,748 B2 * | 6/2006 | Ito et al. | ................... | 361/321.4 |
| 2002/0013213 A1 | 1/2002 | Sato et al. | | |

FOREIGN PATENT DOCUMENTS

| | | |
|---|---|---|
| EP | 1 094 477 A2 | 4/2001 |
| EP | 1 146 024 A1 | 10/2001 |
| EP | 1 262 467 A1 | 12/2002 |
| JP | A-04-292458 | 10/1992 |
| JP | A-04-292459 | 10/1992 |
| JP | A-04-295048 | 10/1992 |
| JP | A-05-109319 | 4/1993 |
| JP | A-06-243721 | 9/1994 |
| JP | A-09-040465 | 2/1997 |
| JP | A-10-025157 | 1/1998 |
| JP | A-2000-154057 | 6/2000 |
| JP | A-2001-192264 | 7/2001 |
| JP | A-2002-255639 | 9/2002 |

* cited by examiner

*Primary Examiner*—Karl Group
(74) *Attorney, Agent, or Firm*—Oliff & Berridge, PLC

(57) ABSTRACT

A dielectric ceramic composition, comprising a main component including barium titanate; a first subcomponent including at least one kind selected from MgO, CaO, BaO and SrO; a second subcomponent functioning as a sintering auxiliary agent; a third subcomponent including at least one kind selected from $V_2O_5$, $MoO_3$ and $WO_3$; a fourth subcomponent including an oxide of R1 (note that R1 is at least one kind selected from Sc, Er, Tm Yb and Lu); a fifth subcomponent including $CaZrO_3$ or $CaO+ZrO_2$; and an eighth subcomponent including an oxide of A (note that A is at least one kind selected from a cation element group having an effective ionic radius at the time of 6 coordination of 0.065 nm to 0.085 nm); wherein a ratio of the eighth subcomponent with respect to 100 moles of the main component is 0 to 4 moles (note that 0 mole and 4 moles are excluded, and the value is in terms of an A oxide).

20 Claims, 3 Drawing Sheets

DIELECTRIC CERAMIC COMPOSITION AND ELECTRONIC DEVICE

BACKGROUND OF THE INVENTION

1. Field of the Invention

The present invention relates to a dielectric ceramic composition having reduction resistance and an electronic device, such as a multilayer ceramic capacitor, using the dielectric ceramic composition.

2. Description of the Related Art

A multilayer ceramic capacitor as an electronic device is required to have a high specific permittivity, long lifetime of insulation resistance IR and preferable DC bias characteristics (change of specific permittivity over time is a little) and, moreover, required to have preferable temperature characteristics. Particularly, depending on the use object, the temperature characteristics are required to be flat under severe conditions. In recent years, multilayer ceramic capacitors have come to be used in a variety of electronic apparatuses mounted in engine compartments of automobiles, such as an electronic control unit (ECU), a crank angle sensor and an Anti Lock Brake System (ABS) module. Since these electronic apparatuses are for stable engine controlling, drive controlling and brake controlling, preferable temperature stability of the circuit is required.

Environments of using the electronic apparatuses are expected to become about −20° C. or lower in winter in cold climates and about +130° C. or higher after the engine starts in summer. Recently, there is a tendency of reducing a wire harness for connecting the electronic apparatus and an apparatus to be controlled thereby and the electronic apparatus may be provided outside of a vehicle, therefore, environments for the electronic apparatuses have been getting more severe. Accordingly, a capacitor used by the electronic apparatuses is required to have flat temperature characteristics in a wide temperature range. Specifically, it is not sufficient when the capacitor-temperature characteristics only satisfy the X7R characteristic of EIA standard (−55 to 125° C. and ΔC/C=within ±15%), and a dielectric ceramic composition satisfying the X8R characteristics of EIA standard (−55 to 150° C. and ΔC/C=within ±15%) is required.

There are some proposals on dielectric ceramic compositions satisfying the X8R characteristics.

In the Japanese Unexamined Patent Publication No. 10-25157 and the Japanese Unexamined Patent Publication No. 9-40465, shifting of a Curie's temperature to the high temperature side by substituting Ba in $BaTiO_3$ by Bi and Pb, etc. has been proposed to satisfy the X8R characteristics in a dielectric ceramic composition including $BaTiO_3$ as the main component. Also, there are proposals of satisfying the X8R characteristics by selecting a composition of $BaTiO_3 + CaZrO_3 + ZnO + Nb_2O_5$ system (the Japanese Unexamined Patent Publication No. 4-295048, the Japanese Unexamined Patent Publication No. 4-292458, the Japanese Unexamined Patent Publication No. 4-292459, the Japanese Unexamined Patent Publication No. 5-109319 and the Japanese Unexamined Patent Publication No. 6-243721).

However, since all of these composition systems use a volatile Pb, Bi and Zn, firing in the air or other oxidizing atmosphere becomes a premise. Therefore, there is a disadvantage that inexpensive base metals, such as Ni, cannot be used for internal electrodes of the capacitor and expensive precious metals, such as Pd, Au and Ag, have to be used.

On the other hand, the present applicant has already proposed a dielectric ceramic composition described below (the Japanese Unexamined Patent Publication No. 2000-154057) for the purpose of having a high permittivity, satisfying the X8R characteristics, and enabling firing in a reducing atmosphere. The dielectric ceramic composition described in the Japanese Unexamined Patent Publication No. 2000-154057 comprises at least $BaTiO_3$ as the main component; a first subcomponent including at least one kind selected from MgO, CaO, BaO, SrO and $Cr_2O_3$; a second subcomponent expressed by $(Ba, Ca)_xSiO_{2+x}$ (note that x=0.8 to 1.2); a third subcomponent including at least one kind selected from $V_2O_5$, $MoO_3$ and $WO_3$; and a fourth subcomponent including an oxide of R1 (note that R1 is at least one kind selected from Sc, Er, Tm, Yb and Lu); and ratios of the respective subcomponents with respect to 100 moles of the main component are the first subcomponent: 0.1 to 3 moles, second subcomponent: 2 to 10 moles, third subcomponent: 0.01 to 0.5 mole, and fourth subcomponent: 0.5 to 7 moles (note that the number of moles of the fourth subcomponent is a ratio of R1 alone).

Also, the present applicant has already proposed a dielectric ceramic composition described below (the Japanese Unexamined Patent Publication No. 2001-192264). The dielectric ceramic composition described in the Japanese Unexamined Patent Publication No. 2001-192264 includes at least a main component including barium titanate, a first subcomponent including at least one kind selected from MgO, CaO, BaO, SrO and $Cr_2O_3$; a second subcomponent including an oxide silicon as a main ingredient; a third subcomponent including at least one kind selected from $V_2O_5$, $MoO_3$ and $WO_3$; a fourth subcomponent including an oxide of R1 (note that R1 is at least one kind selected from Sc, Er, Tm, Yb and Lu); and a fifth subcomponent including $CaZrO_3$ or $CaO+ZrO_2$; and ratios of the respective subcomponents with respect to 100 moles of the main component are the first subcomponent: 0.1 to 3 moles, second subcomponent: 2 to 10 moles, third subcomponent: 0.01 to 0.5 mole, fourth subcomponent: 0.5 to 7 moles (note that the number of moles of the fourth subcomponent is a ratio of R1 alone) and fifth subcomponent: 0<fifth subcomponent≦5 moles.

In all of the above patent applications filed by the present applicant, a ratio of the first subcomponent, such as MgO, with respect to 100 moles of the main component is 0.1 mole or higher.

Also, the present applicant has already proposed a dielectric ceramic composition described below (the Japanese Unexamined Patent Publication No. 2002-255639). The dielectric ceramic composition described in the Japanese Unexamined Patent Publication No. 2002-255639 comprises a main component including barium titanate, a first subcomponent including an oxide of AE (note that AE is at least one kind selected from Mg, Ca, Ba and Sr); and a second subcomponent including an oxide of R (note that R is at least one kind selected from Y, Dy, Ho and Er); and ratios of the respective subcomponents with respect to 100 moles of the main component are the first subcomponent: 0<first subcomponent<0.1 mole and second subcomponent: 1 mole<second subcomponent<7 moles.

According to the techniques in the Japanese Unexamined Patent Publication No. 2000-154057, the Japanese Unexamined Patent Publication No. 2001-192264 and the Japanese Unexamined Patent Publication No. 2002-255639 by the present applicant explained above, it is possible to obtain a high permittivity, the X8R characteristics are satisfied, and firing in a reducing atmosphere is possible.

However, although the X8R characteristics are satisfied, the IR temperature dependency from the room temperature to a high temperature range was poor and the practical use as a product has sometimes become difficult.

SUMMARY OF THE INVENTION

An object of the present invention is to provide a dielectric ceramic composition having a high specific permittivity, capable of maintaining a lifetime of insulation resistance and satisfying the X8R characteristics (−55 to 150° C. and ΔC/C=within ±15%) of EIA standard, able to be fired in a reducing atmosphere and having improved IR temperature dependency. Another object of the present invention is to provide an electronic device, such as a multilayer ceramic capacitor, using the dielectric ceramic composition and capable of realizing a compact body with a large capacity, particularly, being ready for attaining a thin layer compact body.

To attain the above objects, according to a first aspect of the present invention, there is provided a dielectric ceramic composition, comprising:

a main component including barium titanate;

a first subcomponent including at least one kind selected from MgO, CaO, BaO and SrO;

a second subcomponent functioning as a sintering auxiliary agent;

a third subcomponent including at least one kind selected from $V_2O_5$, $MoO_3$ and $WO_3$;

a fourth subcomponent including an oxide of R1 (note that R1 is at least one kind selected from Sc, Er, Tm, Yb and Lu);

a fifth subcomponent including $CaZrO_3$ or $CaO+ZrO_2$; and an eighth subcomponent including an oxide of A (note that A is at least one kind selected from a cation element group having an effective ionic radius at the time of 6 coordination of 0.065 nm to 0.085 nm);

wherein a ratio of said eighth subcomponent with respect to 100 moles of said main component is 0 to 4 moles (note that 0 mole and 4 moles are excluded, and the value is in terms of an A oxide).

In the first aspect, preferably, said A of the oxide included in said eighth subcomponent is at least one kind selected from a cation element group of Al, Cr, Ga and Ge.

In the first aspect, preferably, ratios of respective subcomponents with respect to 100 moles of said main component are the first subcomponent: 0.1 to 3 moles, the second subcomponent: 2 to 10 moles, the third subcomponent: 0.01 to 0.5 mole, the fourth subcomponent: 0.5 to 7 moles (note that the number of moles of the fourth subcomponent is a ratio of R1 alone), and the fifth subcomponent: 0<fifth subcomponent≦5 moles.

In the first aspect, preferably, an oxide of R2 (note that R2 is at least one kind selected from Y, Dy, Ho, Tb, Gd and Eu) as a sixth subcomponent is furthermore included, wherein a content of said sixth subcomponent is 9 moles or smaller (note that the number of moles of the sixth subcomponent is a ratio of R2 alone) with respect to 100 moles of the main component including barium titanate.

In the first aspect, preferably, a total content of the fourth subcomponent and the sixth subcomponent is 13 moles or smaller (note that the number of moles of the fourth subcomponent and the sixth subcomponent is a ratio of R1 and R2 alone) with respect to 100 moles of the main component including barium titanate.

In the first aspect, preferably, said second subcomponent is expressed by at least one kind selected from $SiO_2$, MO (note that M is at least one kind of element selected from Ba, Ca, Sr and Mg), $Li_2O$ and $B_2O_3$. The second subcomponent is considered to serve as a sintering auxiliary agent.

In the fifth subcomponent, the mole-ratio of Ca and Zr may be any, but preferably Ca/Zr=0.5 to 1.5, more preferably Ca/Zr=0.8 to 1.5, and particularly preferably Ca/Zr=0.9 to 1.1.

In the fist aspect, preferably, MnO as a seventh subcomponent is furthermore included, wherein a content of said seventh subcomponent is 0.5 mole or smaller with respect to 100 moles of the main component including barium titanate.

Alternately, according to a second aspect of the present invention, there is provided a dielectric ceramic composition, comprising:

a main component including barium titanate;

a first subcomponent including MgO;

a second subcomponent functioning as a sintering auxiliary agent;

a third subcomponent including at least one kind selected from $V_2O_5$, $MoO_3$ and $WO_3$;

a fourth subcomponent including an oxide of R1 (note that R1 is at least one kind selected from Sc, Er, Tm, Yb and Lu);

a fifth subcomponent including $CaZrO_3$ or $CaO+ZrO_2$;

a seventh subcomponent including MnO or $Cr_2O_3$; and an eighth subcomponent including $Al_2O_3$;

wherein ratios of said first subcomponent, seventh subcomponent and eighth subcomponent with respect to 100 moles of said main component are the first subcomponent: 0.2 to 0.75 mole, the seventh subcomponent: 0.1 to 0.3 mole (note that the number of moles of the seventh subcomponent is a ratio in terms of a Mn element or Cr element), and the eighth subcomponent: 0.5 to 4 moles (note that 4 moles is excluded); and a Mg element included in said first subcomponent and a Mn element and Cr element included in said seventh subcomponent are in a relationship of 0.3≦(Mn+Cr)/Mg≦0.5 in a mole ratio.

The second aspect has the most significant feature in the point that it is essential to include MgO as the first subcomponent and $Al_2O_3$ as the eighth subcomponent, and a content of MgO as the first subcomponent and a content of MnO or $Cr_2O_3$ are in the above relationship explained above.

In the second aspect, preferably, ratios of said second to fifth subcomponents with respect to 100 moles of said main component are the second subcomponent: 2 to 10 moles the third subcomponent: 0.01 to 0.5 mole the fourth subcomponent: 0.5 to 7 moles (note that the number of moles of the fourth subcomponent is a ratio of R1 alone), and the fifth subcomponent: 0<fifth subcomponent≦5.

In the second aspect, preferably, an oxide of R2 (note that R2 is at least one kind selected from Y, Dy, Ho, Tb, Gd and Eu) as a sixth subcomponent is furthermore included, wherein a content of said sixth subcomponent is 9 moles or smaller (note that the number of moles of the sixth subcomponent is a ratio of R2 alone) with respect to 100 moles of the main component including barium titanate.

In the second aspect, preferably, a total content of the fourth subcomponent and the sixth subcomponent is 13 moles or smaller (note that the number of moles of the fourth subcomponent and the sixth subcomponent is a ratio of R1 and R2 alone) with respect to 100 moles of the main component including barium titanate.

In the second aspect, preferably, said first subcomponent furthermore includes one or more kinds selected from CaO, BaO and SrO.

In the second aspect, preferably, said second subcomponent is expressed by at least one kind selected from $SiO_2$, MO (note that M is at least one kind of element selected from Ba, Ca, Sr and Mg), $Li_2O$ and $B_2O_3$.

An electronic device according to the first aspect and the second aspect of the present invention is not particularly limited as far as it comprises a dielectric layer and is, for example, a multilayer ceramic capacitor having a capacitor element body, wherein dielectric layers and internal electrode layers are alternately stacked. In the present invention, the dielectric layer is composed of the dielectric ceramic composition according to either one of the first aspect or the second aspect. As a conductive material included in the internal electrode layer is not particularly limited and is, for example, Ni or a Ni alloy.

As an electronic device according to the first aspect and the second aspect of the present invention, specifically, a multilayer ceramic capacitor, piezoelectric device, chip inductor, chip varistor, chip thermistor, chip resistor, and other surface mounted chip electronic devices (SMD) may be mentioned.

Note that an ionic radius described in the present specification is a value based on the article "R. D. Shannon, Acta Crystallogr., A32,751 (1976)".

The present inventors pursued study on a specific element group capable of improving IR temperature dependency without affecting the targeted temperature characteristics (X8R characteristics), found that a cation element group having an effective ionic radius at the time of 6 coordination is in a predetermined range is effective, and completed the present invention (the invention according to the first aspect) based on the knowledge.

The "IR temperature dependency" is an index for assessing how the insulation resistance IR changes against temperature change. The IR temperature dependency can be evaluated by calculating a change rate of IR at a predetermined temperature (for example, 150° C.) changed from IR at a reference temperature (for example, the room temperature of 25° C.). The smaller the change rate of IR between a plurality of temperatures, the more preferable the IR temperature dependency is; and the larger, the poorer the IR temperature dependency is. Even though the temperature characteristics of capacitance satisfies the X8R of EIA standard, if the IR temperature dependency in the temperature range of the X8R (particularly from the room temperature to a high-temperature) is poor, the practical use as a product becomes difficult.

In the present invention, when assuming that the room temperature (25° C.) and a high temperature part (150° C.) are used as examples of the plurality of temperatures and insulation resistance at the respective temperatures are $IR_{25}$ and $IR_{150}$, the IR temperature dependency is evaluated to be good or bad by calculating values of "a loss of significant digits of IR" expressed by the formula (1) below.

$$\log(IR_{150}/IR_{25}) \quad (1)$$

In the present invention, an eighth subcomponent composed of a specific element group is added to a dielectric composition having a high specific permittivity, capable of satisfying the X8R characteristics. Therefore, the dielectric ceramic composition according to the present invention satisfies the X8R characteristics and the IR temperature dependency from the room temperature (25° C.) to the high temperature (150° C.) is small. Specifically, the loss of significant digits of IR expressed by the above formula 1 can be −2.00 or higher.

The dielectric ceramic composition according to the present invention has a high specific permittivity, and the capacity-temperature characteristics satisfy the X8R characteristics of EIA standard, so that an electronic device, such as a ceramic chip capacitor, using the dielectric ceramic composition of the present invention can be preferably used even in an environment of being exposed to a high temperature, such as an engine room of a vehicle.

Also, the dielectric ceramic composition according to the present invention does not included volatile Pb, Bi and Zn elements. Therefore, firing in a reducing atmosphere is possible.

Namely, according to the present invention, it is possible to provide a dielectric ceramic composition having a high specific permittivity, capable of maintaining a lifetime of insulation resistance, having capacity-temperature characteristics satisfying the X8R characteristics of EIA standard, able to be fired in a reducing atmosphere and having improved IR temperature dependency.

When producing an electronic device, such as a ceramic chip capacitor, by using the dielectric ceramic composition of the present invention, it becomes possible to use base metals, such as Ni and a Ni alloy, as an internal electrode, so that a cost reduction of the electronic device can be attained. Moreover, even if the dielectric ceramic composition is fired in a reducing atmosphere, an electronic device to be obtained satisfies the X8R characteristics, capacity aging characteristics by applying a direct current electric field is preferable (that is, change of the capacity over time is small), deterioration of insulation resistance is small, and superior reliability can be obtained.

Namely, an electronic device, such as a multilayer ceramic capacitor, having a dielectric layer composed of the dielectric ceramic composition of the present invention is stably operational in a variety of apparatuses used in a severe environment, such as an electronic apparatus of a vehicle, so that reliability of the apparatus, wherein the electronic device is applied, can be improved remarkably.

From the above, the dielectric composition of the present invention is expected to give an effect as a measure to suppress deterioration of a temperature change rate in a high temperature range caused as a result of dielectric layers becoming thinner.

Furthermore, the dielectric ceramic composition according to the present invention has a long lifetime of insulation resistance and, furthermore, stable DC bias characteristics (dependency of permittivity at applying a direct current voltage) and TC bias characteristics (capacity-temperature characteristics at applying a direct current voltage). Particularly, by adding the eighth subcomponent, remarkable improvement of the TC bias characteristics can be observed.

Moreover, the dielectric ceramic composition according to the present invention does not include harmful substances, such as Pb and Bi, so that the adverse effect on the environment due to disposal after using is small.

Accordingly, by using the dielectric ceramic composition of the present invention, it is possible to easily provide an electronic device, such as a multilayer ceramic capacitor, having excellent characteristics. Also, by using dielectric ceramic composition of the present invention, even when the dielectric layer is made thin, the X8R characteristics can be satisfied and, moreover, a decline of a lifetime of insulation resistance can be effectively prevented. Therefore, a compact body with a large capacity can be realized in the multilayer ceramic capacitor and other electronic devices, and particularly it is easy to respond to attaining a furthermore thin layer and compact body. Accordingly, mounting to a highly integrated circuit becomes easier.

In the dielectric ceramic composition of the related art, it was liable that particularly the capacity-temperature characteristics on the high temperature side deteriorated as a dielectric layer became thinner. Namely, there was a tendency that a curve of the capacity temperature change rate on the high temperature side came toward the clockwise direction. On the other hand, according to the present invention, the curve of the capacity temperature change rate on the high temperature side can be directed toward the anticlockwise direction. When applying this phenomenon to an electronic device satisfying the X7R characteristics, a furthermore thinner dielectric layer than those in the related art can be realized.

Furthermore, in the invention according to the second aspect, $Al_2O_3$ is essentially included as the eighth subcomponent, and a ratio of a content of MgO essentially included in the first subcomponent and a content of the seventh subcomponent including MnO or $Cr_2O_3$ is a predetermined range, that is, a Mg element included in the first subcomponent, Mn element and Cr element included in the seventh subcomponent are in a range of $0.3 \leq (Mn+Cr)/Mg \leq 0.5$. Therefore, in addition to the effects explained above, improvement of the high temperature accelerated lifetime can be also attained.

BRIEF DESCRIPTION OF DRAWINGS

Below, embodiments of the present invention will be explained based on the drawings, in which.

DESCRIPTION OF THE PREFERRED EMBODIMENT

First Embodiment

Below, a first embodiment of the present invention will be explained.

In the first embodiment, a multilayer ceramic capacitor 1 shown in FIG. 1 as an electronic device will be taken as an example and the configuration and production method will be explained.

Multilayer Ceramic Capacitor

Figure 1:
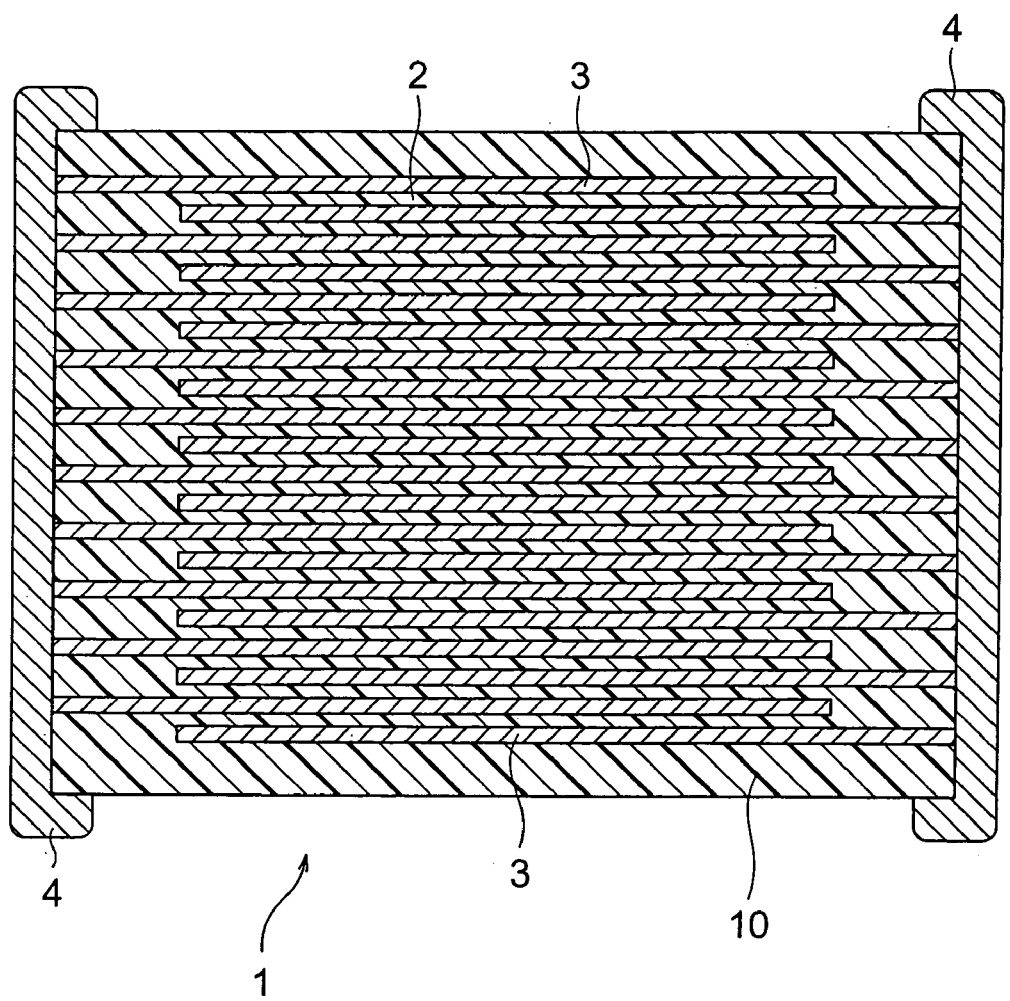
FIG. 1 is a sectional view of a multilayer ceramic capacitor according to an embodiment of the present invention.

As shown in FIG. 1, a multilayer ceramic capacitor 1 as an electronic device according to the first embodiment of the present invention comprises a capacitor element body 10, wherein dielectric layers 2 and internal electrode layers 3 are alternately stacked. Both end portions of the capacitor element body 10 are formed with a pair of external electrodes 4 respectively conducting to the internal electrode layers 3 arranged alternately in the element body 10. The internal electrode layers 3 are stacked, so that the respective end surfaces are exposed alternately to surfaces of two facing end portions of the capacitor element body 10. The pair of external electrodes 4 are formed on both end portions of the capacitor element body 10 and connected to the exposed end surfaces of the alternately arranged internal electrode layers 3, so that a capacitor circuit is configured.

A shape and size of the capacitor element body 10 are not particularly limited and may be suitably set in accordance with the use object, but is normally rectangular parallelepiped and the size may be normally a length (0.4 to 5.6 mm)×width (0.2 to 5.0 mm)×height (0.2 to 1.9 mm) or so.

Dielectric Layer

The dielectric layers 2 are composed of a dielectric ceramic composition according to the first aspect of the present invention.

The dielectric ceramic composition according to the first aspect of the present invention includes a main component including barium titanate (preferably, expressed by a composition formula $Ba_mTiO_{2+m}$, wherein "m" satisfies $0.995 \leq m \leq 1.010$ and a ratio of Ba and Ti satisfies $0.995 \leq Ba/Ti \leq 1.010$);, a first subcomponent including at least one kind selected from MgO, CaO, BaO and SrO;

a second subcomponent functioning as a sintering auxiliary agent;

a third subcomponent including at least one kind selected from $V_2O_5$, $MoO_3$ and $WO_3$;

a fourth subcomponent including an oxide of R1 (note that R1 is at least one kind selected from Sc, Er, Tm, Yb and Lu);

a fifth subcomponent including $CaZrO_3$ or $CaO+ZrO_2$; and an eighth subcomponent including an oxide of A (note that A is at least one kind selected from a group of cation elements having an effective ionic radius at the time of 6 coordination of 0.065 nm to 0.085 nm).

The eighth subcomponent does not affect capacity-temperature characteristics much and has an effect of improving the IR temperature dependency. A feature of the first aspect of the present invention is the point that a predetermined amount of the eighth subcomponent composed of a specific element group is included in a dielectric composition satisfying the X8R characteristics.

In the cation element group of the eighth subcomponent, I (0.067 nm), Ge (0.067 nm), Al (0.0675 nm), Cu (0.068 nm), Fe (0.069 nm), Ni (0.070 nm), Au (0.071 nm), As (0.072 nm), Cr (0.0755 nm), Ga (0.076 nm), At (0.076 nm), Os (0.077 nm), Nb (0.078 nm), Ta (0.078 nm), Co (0.079 nm), Rh (0.080 nm), Ir (0.082 nm), Ru (0.082 nm) and Sn (0.083 nm) are included, but P (0.052 nm) and K (0.152 nm) are not included. Note that numbers in brackets indicate an effective ionic radius at the time of 6 coordination. It will be the same below.

Among the above cation element group, elements having an effective ionic radius at the time of 6 coordination of 0.067 to 0.076 nm are preferably used. The preferable element group includes I, Ge, Al, Cu, Fe, Ni, Au, As, Cr, Ga and At, more preferably at least one kind selected from a cation element group of Al, Cr, Ga and Ge, and furthermore preferably at least Al is used. When using by combining two or more kinds, particularly preferable combinations are Al+Cr, Al+Ga and Al+Ge.

A content of the eighth subcomponent is 0 to 4 moles (note that 0 mole and 4 moles are excluded) in terms of an A oxide, preferably 0 to 3.5 moles (note that 0 mole is not included), more preferably 0.5 to 3.5 moles, furthermore preferably 1 to 2 moles, and particularly preferably 1 to 1.5 moles with respect to 100 moles of the main component. When the content of the eighth subcomponent is too small, an effect of improving the IR temperature dependency becomes insufficient. While when the content is too large, the capacity-temperature characteristics tend to decline. Particularly, by adding more than 1 mole of the eighth subcomponent, the TC bias characteristic is remarkably improved.

The above ratios of the eighth subcomponent are not mole ratios of A alone but of an A oxide. Namely, for example, when using an oxide of Al as the eighth subcomponent, the ratio of the eighth subcomponent being 1 mole does not mean that the ratio of Al is 1 mole but the ratio of $Al_2O_3$ is 1 mole.

Note that when using two or more kinds of elements (oxides) as the eighth subcomponent, it is sufficient that the total content is in the above range with respect to 100 moles of the main component. Namely, component ratios of respective oxides in the eighth subcomponent may be any.

Ratios of the subcomponents with respect to 100 moles of $BaTiO_3$ as a main component are
first subcomponent: 0.1 to 3 moles
second subcomponent: 2 to 10 moles
third subcomponent: 0.01 to 0.5 mole
fourth subcomponent: 0.5 to 7 moles
fifth subcomponent: 0<fifth subcomponent≦5 moles;
and preferably
first subcomponent: 0.5 to 2.5 moles
second subcomponent: 2.0 to 5.0 moles
third subcomponent: 0.1 to 0.4 mole
fourth subcomponent: 0.5 to 5.0 moles
fifth subcomponent: 0.5 to 3 moles.

Note that the ratio of the fourth subcomponent is not a mole ratio of the R1 oxide but a mole ratio of R1 alone. Namely, for example, when using an oxide of Yb as the fourth subcomponent, the ratio of the fourth subcomponent being 1 mole does not mean that the ratio of $Yb_2O_3$ is 1 mole but the ratio of Yb is 1 mole.

In the present specification, respective oxides composing the main component and subcomponents are expressed by stoichiometric compositions, but oxidization states of the oxides may be deviated from the stoichiometric compositions. Note that each of the above ratios of the respective subcomponents is obtained by converting a metal quantity included in oxides composing the subcomponent to an oxide of the above stoichiometric composition.

As a result that the above first to fifth subcomponents are included, the X8R characteristics can be satisfied while maintaining the high permittivity. Preferable contents of the first to fifth subcomponents and the reasons are as below.

The first subcomponent (MgO, CaO, BaO and SrO) exhibits an effect of flattening the capacity-temperature characteristics. When a content of the first subcomponent is too small, the capacity temperature change rate becomes large. While when the content is too much, sinterability is deteriorated. Note that component ratios of the oxides in the first subcomponent may be any.

The second subcomponent serves as a sintering auxiliary agent. As a compound serving as a sintering auxiliary agent as such, a compound expressed by at least one kind selected from $SiO_2$, MO (note that M is at least one kind of element selected from Ba, Ca, Sr and Mg), $Li_2O$ and $B_2O_3$ may be preferably used. The second subcomponent as such has an effect of improving the defective rate of initial insulation resistance in the case of a thin layer in addition to the effect as a sintering auxiliary agent. When a content of the second subcomponent is too small, the capacity-temperature characteristics become poor and the IR. (insulation resistance) declines. While when the content is too much, the IR lifetime becomes insufficient and an abrupt decline of the permittivity is caused.

More preferably, the second subcomponent is expressed by $(Ba, Ca)_xSiO_{2+x}$ (note that x=0.7 to 1.2). BaO and CaO in $[(Ba, Ca)_xSiO_{2+x}]$ as a more preferable form of the second subcomponent are also included in the first subcomponent. However, $(Ba, Ca)_xSiO_{2+x}$ as a composite oxide has a low melting point and has preferable reactivity with the main component, so that BaO and/or CaO are preferably added as the above composite oxides in the present invention. In $(Ba, Ca)_xSiO_{2+x}$ as a more preferable form of the second subcomponent, "x" is preferably 0.7 to 1.2, and more preferably 0.8 to 1.1. When "x" is too small, that is, when $SiO_2$ is too much, it reacts with the main component $BaTiO_3$ to deteriorate the dielectric characteristics. While when the "x" is too large, the melting point becomes high to deteriorate the sinterability, which is not preferable. Note that a ratio of Ba and Ca may be any and only one of them may be included.

The third subcomponent ($V_2O_5$, $MoO_3$ and $WO_3$) gives an effect of flattening the capacity-temperature characteristic at the Curie's temperature or higher and an effect of improving the IR lifetime. When a content of the third subcomponent is too small, the effects become insufficient. On the other hand, when the content is too much, the IR remarkably declines. Note that composing ratio of each oxide in the third subcomponent may be any.

The fourth subcomponent (an oxide of R1) gives an effect of shifting the Curie's temperature to the high temperature side and an effect of flattening the capacity-temperature characteristic. When a content of the fourth subcomponent is too small, the effects become insufficient and the capacity-temperature characteristic becomes poor. On the other hand, when the content is too large, the sinterability tends to decline. As the fourth subcomponent, a Yb oxide is preferable because of the superior effect of improving the characteristics and the low price.

The fifth subcomponent ($CaZrO_3$) has effects of shifting the Curie's temperature to the high temperature side and flattening the capacity-temperature characteristics. Effects of improving the CR product and DC dielectric breakdown strength are also given. Note that when a content of the fifth subcomponent is too large, the IR accelerated lifetime declines remarkably and the capacity-temperature characteristics (X8R characteristics) become poor. A form of $CaZrO_3$ to be added is not particularly limited and CaO and other oxides composed of Ca, $CaCO_3$ and other carbonates, organic compounds, and $CaZrO_3$, etc. may be mentioned. A ratio of Ca and Zr is not particularly limited and may be determined to be a degree of not to be dispersed in solid in the main component $BaTiO_3$, but the mole ratio of Ca to Zr (Ca/Zr) is preferably 0.5 to 1.5, more preferably 0.8 to 1.5, and furthermore preferably 0.9 to 1.1.

By adjusting contents of the fourth subcomponent (R1 oxide) and the fifth subcomponent ($CaZrO_3$), it is possible to flatten the capacity-temperature characteristics (X8R characteristics) and improve the high temperature accelerated lifetime and CR product. Particularly, in the range of values explained above, deposition of a hetero phase is suppressed and the conformation can be homogenized. When a content of the fourth subcomponent is too much, a pyrochlore phase as enormous acicula crystal is easily deposited, and a remarkable decline of characteristics (a decrease of CR product) is exhibited when a thickness between dielectric layers is made thin in the multilayer ceramic capacitor. On the other hand, when the content of the fourth subcomponent is too small, the capacity-temperature characteristics cannot be satisfied. When the content of the fifth subcomponent is too much, although the CR product and direct current breakdown voltage VB are improved, the capacity-temperature characteristics are deteriorated and the IR accelerated lifetime declines.

The dielectric ceramic composition according to the first aspect preferably includes an R2 oxide (note that R2 is at least one kind selected from Y, Dy, Ho, Tb, Gd and Eu) for 9 moles or smaller (more preferably, 0.5 to 9 moles) as a sixth subcomponent in accordance with need. The sixth subcomponent (R2 oxide) has an effect of improving the IR and IR lifetime and gives a little adverse effect on the capacity-temperature characteristics. Note that when a content of the R2 oxide is too much, the sinterability tends to decline. As the sixth subcomponent, a Y oxide is preferable due to the high efficiency on improving the characteristics and the low price.

A total content of the fourth subcomponent and the sixth subcomponent with respect to 100 moles of $BaTiO_3$ as the main component is preferably 13 moles or smaller, and more preferably 10 moles or smaller (note that the number of moles of the fourth subcomponent and the sixth subcomponent is a ratio of R1 and R2 alone). It is for maintaining the preferable sinterability.

Also, the dielectric ceramic composition according to the first aspect may include MnO as a seventh subcomponent. The seventh subcomponent has an effect of accelerating sintering, an effect of heightening the IR, and an effect of improving the IR lifetime. To sufficiently obtain the effects, a ratio of the seventh subcomponent with respect to 100 moles of $BaTiO_3$ is preferably 0.01 mole or higher. Note that when the content of the seventh subcomponent is too large, the capacity-temperature characteristics are adversely affected, so that 0.5 mole or smaller is preferable.

Note that when at least one kind of Sr, Zr and Sn substitutes Ba or Ti in the main component composing the perovskite structure, the Curie's temperature shifts to the low temperature side, so that the capacity-temperature characteristics at 125° C. or higher become deteriorated. Therefore, it is preferable not to use $BaTiO_3$ including these elements [for example, $(Ba, Sr)TiO_3$] as the main component. Note that as far as it is included at a level of impurities (about 0.1 mole % or so of the entire dielectric ceramic composition), it does not cause any problems.

An average crystal grain diameter of the dielectric ceramic composition according to the first aspect is not particularly limited and may be suitably determined, for example, from a range of 0.1 to 3 µm in accordance with a thickness of the dielectric layer, etc.

The capacity-temperature characteristics tend to deteriorate as the dielectric layer becomes thinner and as the average crystal grain diameter becomes smaller. Therefore, the dielectric ceramic composition of the present invention is particularly effective when the average crystal grain diameter has to be small, such that the average crystal grain diameter is 0.1 to 0.5 µm. Also, when the average crystal grain diameter becomes small, the IR lifetime becomes long and change of a capacity under a direct current electric field over time reduces, so that the average crystal grain diameter is preferably small from that viewpoint.

The Curie's temperature (a phase transition temperature from a ferroelectric to paraelectric) of the dielectric ceramic composition according to the first aspect can be changed by selecting the composition, and 120° C. or higher is preferable and 123° C. or higher is more preferable to satisfy the X8R characteristics. Note that the Curie's temperature can be measured by differential scanning calorimetry (DSC), etc.

A thickness of one dielectric layer composed of the dielectric ceramic composition according to the first aspect is normally 40 µm or thinner, and particularly 30 µm or thinner. The lower limit of the thickness is normally 0.5 µm or so.

The dielectric ceramic composition according to the first aspect is effective to improve the capacity-temperature characteristics of a multilayer ceramic capacitor having such a dielectric layer made to be a thin layer. Note that the number of stacked layers of the dielectric layers is normally 2 to 300 or so.

The multilayer ceramic capacitor using the dielectric ceramic composition according to the first aspect is preferably used as an electronic device for apparatuses used under an environment of 80° C. or higher, and particularly 125 to 150° C. When in the temperature range, temperature characteristics of the capacity satisfy the R characteristics of EIA standard and, furthermore, satisfy the X8R characteristics. It is also possible to satisfy the B characteristics [capacity change rate is within ±10% at −25 to 85° C. (the reference temperature is 20° C.)] of EIAJ standard and the X7R characteristics (−55 to 125° C. and ΔC=within ±15%) of EIA standard at the same time.

Moreover, for example, when assuming insulation resistance at the room temperature (25° C.) is $IR_{25}$ and that in a high temperature range (150° C.) is $IR_{150}$, "a loss of significant digits of IR" expressed by the formula (1) below can be −2.00 or higher. Namely, the IR temperature dependency is low.

$$\log(IR_{150}/IR_{25}) \qquad (1)$$

In the multilayer ceramic capacitor, the dielectric layers are applied with an alternating electric filed of normally 0.02 V/µm or higher, particularly 0.2 V/µm or higher, and furthermore preferably 0.5 V/µm or higher, and generally about 5 V/µm or lower and a direct current electric field of 5 V/µm or lower is applied by superimposing thereon, however, the temperature characteristics of the capacity is stable even when such electric fields are applied.

Internal Electrode Layer

A conductive material included in the internal electrode layer 3 is not particularly limited, but since components of the dielectric layer 2 has reduction-resistance, base metals may be used. As a base metal to be used as the conductive material, Ni or a Ni alloy is preferable. As the Ni alloy, an alloy of one or more kinds of elements selected from Mn, Cr, Co and Al with Ni is preferable, and a content of Ni in the alloy is preferably 95 wt % or more.

Note that the Ni or Ni alloy may contain various trace components, such as P, by not more than 0.1 wt % or so. A thickness of the internal electrode layer may be suitably determined in accordance with the use object, etc., but normally 0.5 to 5 µm is preferable, and particularly, 0.5 to 2.5 µm or so.

External Electrode

A conductive material included in the external electrode 4 is not particularly limited, and inexpensive Ni, Cu and alloys of these may be used in the present embodiment. A thickness of the external electrode may be suitably determined in accordance with the use object, etc., but normally 10 to 50 µm or so is preferable.

Production Method of Multilayer Ceramic Capacitor

A multilayer ceramic capacitor using the dielectric ceramic composition according to the first aspect of the present invention is produced by preparing a green chip by a normal printing method or sheet method using a paste, firing the same, then, printing or transferring external electrodes and firing in the same way as in a multilayer ceramic capacitor of the related art. Below, the production method will be explained specifically.

First, dielectric ceramic composition powder included in the dielectric layer paste is prepared and made to be slurry to fabricate a dielectric layer paste.

The dielectric layer paste may be organic slurry obtained by kneading the dielectric ceramic composition powder with an organic vehicle or water based slurry.

As the dielectric ceramic composition powder, the above oxides, mixtures thereof, and composite oxides may be used, and also it may be suitably selected from a variety of compounds to be the above oxides, or composite oxides by firing, such as carbonate, oxalate, nitrate, hydroxide and organic metal compound, etc., and mixed for use. A content of each compound in the dielectric ceramic composition powder may be determined, so that a composition of the above dielectric ceramic composition after firing is obtained.

In a state before being made to be slurry, a particle diameter of the dielectric ceramic composition powder is normally 0.1 to 3 μm or so in the average particle diameter.

An organic vehicle is obtained by dissolving a binder in an organic solvent. The binder to be used for the organic vehicle is not particularly limited and may be suitably selected from a variety of normal binders, such as ethyl cellulose and polyvinyl butyral. Also, the organic solvent to be used is not particularly limited and may be suitably selected from a variety of organic solvents, such as terpineol, butyl carbitol, acetone, and toluene, in accordance with a method to be used, such as a printing method and sheet method.

Also, when using water based slurry as a dielectric layer paste, a water based vehicle obtained by dissolving a water-soluble binder and dispersant, etc. in water is kneaded with a dielectric material. The water-soluble binder used for the water based vehicle is not particularly limited and, for example, polyvinyl alcohol, cellulose and water-soluble acrylic resin, etc. may be used.

The internal electrode layer paste is fabricated by kneading a conductive material formed by the above variety of conductive metals and alloys or a variety of oxides, organic metal compounds, and resinates, etc., which become the above conductive materials after firing, with the above organic vehicle.

The external electrode paste may be fabricated in the same way as the above internal electrode layer paste.

A content of the organic vehicle in the above pastes is not particularly limited and may be a normal content, for example, the binder is 1 to 5 wt % or so and the solvent is 10 to 50 wt % or so. Also, additives selected from a variety of dispersants, plasticizers, dielectrics and insulators, etc. may be included in each paste. A total content thereof is preferably 10 wt % or less.

When using a printing method, the dielectric layer paste and the internal electrode layer paste are stacked and printed on a substrate, such as PET, cut to be a predetermined shape and removed from the substrate to obtain a green chip.

When using a sheet method, the dielectric layer paste is used to form a green sheet, the internal electrode layer paste is printed thereon, then, the results are stacked to obtain a green chip.

Before firing, binder removal processing is performed on the green chip. The binder removal processing may be suitably determined in accordance with a kind of a conductive material in the internal electrode layer paste, and when using Ni, a Ni alloy or other base metal as the conductive material, the oxygen partial pressure in the binder removal atmosphere is preferably $10^{-45}$ to $10^5$ Pa. When the oxygen partial pressure is lower than the above range, the binder-removal effect declines. While, when the oxygen partial pressure exceeds the above range, the internal electrode layer tends to be oxidized.

Also, as other binder removal conditions, the temperature rising rate is preferably 5 to 300° C./hour and more preferably 10 to 100° C./hour, the holding temperature is preferably 180 to 400° C. and more preferably 200 to 350° C., and the temperature holding time is preferably 0.5 to 24 hours and more preferably 2 to 20 hours. Also, the firing atmosphere is preferably in the air or a reducing atmosphere, and a preferable atmosphere gas in the reducing atmosphere is, for example, a wet mixed gas of $N_2$ and $H_2$.

An atmosphere when firing the green chip may be suitably determined in accordance with a kind of a conductive material in the internal electrode layer paste, and when using Ni, a Ni alloy and other base metal as the conductive material, the oxygen partial pressure in the firing atmosphere is preferably $10^{-7}$ to $10^{-3}$ Pa. When the oxygen partial pressure is lower than the above range, a conductive material in the internal electrode layer is abnormally sintered to be broken in some cases. While, when the oxygen partial pressure exceeds the above range, the internal electrode layer tends to be oxidized.

Also, the holding temperature at firing is preferably 1100 to 1400° C., more preferably 1200 to 1380° C., and furthermore preferably 1260 to 1360° C. When the holding temperature is lower than the above range, densification becomes insufficient, while when exceeding the above range, breakings of electrodes due to abnormal sintering of the internal electrode layer, deterioration of capacity-temperature characteristics due to dispersion of the internal electrode layer component, and reduction of the dielectric ceramic composition are easily caused.

As other firing conditions, the temperature rising rate is preferably 50 to 500° C./hour and more preferably 200 to 300° C./hour, the temperature holding time is preferably 0.5 to 8 hours and more preferably 1 to 3 hours, and the cooling rate is preferably 50 to 500° C./hour and more preferably 200 to 300° C./hour. Also, the firing atmosphere is preferably a reducing atmosphere and a preferable atmosphere gas is, for example, a wet mixed gas of $N_2$ and $H_2$.

When firing in a reducing atmosphere, it is preferable that annealing is performed on the capacitor element body. Annealing is processing for re-oxidizing the dielectric layer and the IR lifetime is remarkably elongated thereby, so that the reliability is improved.

An oxygen partial pressure in the annealing atmosphere is preferably 0.1 Pa or higher, and particularly 0.1 Pa to 10 Pa. When the oxygen partial pressure is lower than the above range, re-oxidization of the dielectric layer becomes difficult, while when exceeding the above range, the internal electrode layer tends to be oxidized.

The holding temperature at annealing is preferably 1100° C. or lower, and particularly preferably 500 to 1100° C. When the holding temperature is lower than the above range, oxidization of the dielectric layer becomes insufficient, so that the IR becomes low and the IR lifetime becomes short easily. On the other hand, when the holding temperature exceeds the above range, not only the internal electrode layer is oxidized to reduce the capacity, but the internal electrode layer reacts with the dielectric base material, and deterioration of the capacity-temperature characteristics, a decline of the IR and a decline of the IR lifetime are easily caused. Note that the annealing may be composed only of a temperature rising step and a temperature lowering step. Namely, the temperature holding time may be zero. In this case, the holding temperature is a synonym of the highest temperature.

As other annealing conditions, the temperature holding time is preferably 0 to 20 hours and more preferably 2 to 10 hours, and the cooling rate is preferably 50 to 500° C./hour and more preferably 100 to 300° C./hour. Also, a preferable atmosphere gas of annealing is, for example, a wet $N_2$ gas, etc.

In the above binder removal processing, firing and annealing, for example, a wetter, etc. may be used to wet the $N_2$ gas and mixed gas, etc. In this case, the water temperature is preferably 5 to 75° C. or so.

The binder removal processing, firing and annealing may be performed continuously or separately. When performing continuously, the atmosphere is changed without cooling after the binder removal processing, continuously, the temperature is raised to the holding temperature at firing to perform firing. Next, it is cooled and the annealing is preferably performed by changing the atmosphere when the temperature reaches to the holding temperature of the annealing. On the other hand, when performing them separately, at the time of firing, after raising the temperature to the holding temperature of the binder removal processing in an atmosphere of a $N_2$ gas or a wet $N_2$ gas, the atmosphere is changed, and the temperature is preferably furthermore raised. After that, after cooling the temperature to the holding temperature of the annealing, it is preferable that the cooling continues by changing the atmosphere again to a $N_2$ gas or a wet $N_2$ gas. Also, in the annealing, after raising the temperature to the holding temperature under the $N_2$ gas atmosphere, the atmosphere may be changed, or the entire process of the annealing may be in a wet $N_2$ gas atmosphere.

End surface polishing, for example, by barrel polishing or sand blast, etc. is performed on the capacitor element body obtained as above, and the external electrode paste is printed or transferred and fired to form external electrodes 4. A firing condition of the external electrode paste is preferably, for example, at 600 to 800° C. in a wet mixed gas of $N_2$ and $H_2$ for 10 minutes to 1 hour or so. A cover layer is formed by plating, etc. on the surface of the external electrodes 4 if necessary.

A multilayer ceramic capacitor of the present invention produced as above is mounted on a print substrate, etc. by soldering, etc. and used for a variety of electronic apparatuses, etc.

Second Embodiment

Below, a second embodiment of the present invention will be explained.

In the same way as in the first embodiment, a multilayer ceramic capacitor 1 shown in FIG. 1 will be taken as an example of an electronic device and the configuration and production method will be explained in the second embodiment, as well.

In the second embodiment, the point that the dielectric layer 2 includes a dielectric ceramic composition according to the second embodiment is different from the first embodiment.

The most significant feature of the dielectric ceramic composition according to the second aspect is that it is essential to include MgO as the first subcomponent and $Al_2O_3$ as the eighth subcomponent, and a content of MgO as the first subcomponent and a content of MnO or $Cr_2O_3$ are in the above relationship explained above.

Note that an explanation will be omitted on overlapping parts with the first embodiment and only different parts will be explained.

Dielectric Layer

The dielectric layer 2 includes the dielectric ceramic composition according to the second aspect of the present invention.

The dielectric ceramic composition according to the second aspect of the present invention comprises a main component including barium titanate (preferably, expressed by a composition formula $Ba_mTiO_{2+m}$, wherein "m" satisfies $0.995 \leq m \leq 1.010$ and a ratio of Ba and Ti satisfies $0.995 \leq Ba/Ti \leq 1.010$);

a first subcomponent including MgO;

a second subcomponent functioning as a sintering auxiliary agent;

a third subcomponent including at least one kind selected from $V_2O_5$, $MoO_3$ and $WO_3$;

a fourth subcomponent including an oxide of R1 (note that R1 is at least one kind selected from Sc, Er, Tm, Yb and Lu);

a fifth subcomponent including $CaZrO_3$ or $CaO+ZrO_2$;

a seventh subcomponent including MnO or $Cr_2O_3$; and an eighth subcomponent including $Al_2O_3$.

The eighth subcomponent does not affect the capacity-temperature characteristics much and has an effect of improve the IR temperature dependency. In the second embodiment, a predetermined amount of the eighth subcomponent including $Al_2O_3$ is included in a dielectric composition satisfying the X8R characteristics.

A content of the eighth subcomponent is 0.5 to 4 moles (note that 4 moles is not included), preferably 0.5 to 3.5 moles (note that 0 mole is not included), more preferably 1 to 2 moles, and furthermore preferably 1 to 1.5 moles with respect to 100 moles of the main component. When the content of the eighth subcomponent is too small, an effect of improving the IR temperature dependency becomes insufficient. On the other hand, when the content is too much, the capacity-temperature characteristics tend to deteriorate.

The most significant feature of the dielectric ceramic composition according to the second aspect is that predetermined amounts of the first subcomponent and the seventh subcomponent are included in addition to the above predetermined amount of the eighth subcomponent and a content of MgO essentially included in the first subcomponent and a content of the seventh subcomponent including MnO or $Cr_2O_3$ are in a predetermined relationship. Due to the configuration, the high temperature accelerated lifetime can be improved while maintaining the effect of improving the IR temperature dependency brought by adding the eighth subcomponent.

The first subcomponent (wherein MgO is essentially included and CaO, BaO and SrO are optional) has an effect of flattening the capacity-temperature characteristics. Particularly, the essentially included MgO in the first subcomponent also has an effect of improving the high temperature accelerated lifetime and an effect of improving the TC bias characteristics. A content of the fist subcomponent with respect to 100 moles of the main component is 0.2 to 0.75 mole, preferably 0.3 to 0.7 mole, and more preferably 0.35 to 0.5 mole in terms of each oxide. When the content of the first subcomponent is too small, it is liable that the capacity temperature change rate becomes large and the high temperature accelerated lifetime declines. While when the content is too much, the high temperature accelerated lifetime declines. Note that CaO, BaO and SrO are optional components and may be added in accordance with need.

The seventh subcomponent (MnO or $Cr_2O_3$) has an effect of improving the reduction resistance and suppressing the dielectric layer to be semiconductive, an effect of heightening the IR and an effect of improving the high temperature accelerated lifetime. A content of the seventh subcomponent with respect to 100 moles of the main component is 0.1 to 0.3 mole, preferably 0.15 to 0.3 mole, and more preferably 0.2 to 0.25 mole in terms of an Mn element or Cr element. When the content of the seventh subcomponent is too small, the dielectric layer tends to become semiconductive, while when too much, the capacity-temperature characteristics may deteriorate.

Note that in $Cr_2O_3$ as the seventh subcomponent, an effective ionic radius of an Cr element composing $Cr_2O_3$ at the time of 6 coordination is in a range of 0.065 nm to 0.085 nm, so that it falls into the eighth subcomponent in the first embodiment, but it is used as the seventh subcomponent in the second embodiment. Namely, in the second embodiment, $Cr_2O_3$ is added by focusing on effects thereof explained above (improving the reduction resistance, suppressing dielectric layer from becoming semiconductive, improving IR and improving high temperature accelerated lifetime), which is the different point from the first embodiment.

In the dielectric ceramic composition according to the second aspect of the present invention, the content of the first subcomponent and a content of the seventh subcomponent are in the above ranges, and a content of MgO included essentially in the first subcomponent and the content of the seventh subcomponent including MnO or $Cr_2O_3$ are in a predetermined relationship. Namely, the MgO content as the first subcomponent and the content of MnO or $Cr_2O_3$ as the seventh subcomponent are controlled, so that mole ratios of a Mg element included in the first subcomponent and a Mn element and Cr element included in the seventh subcomponent satisfy $0.3 \leq (Mn+Cr)/Mg \leq 0.5$. As a result that the content of MgO, and the content of the seventh subcomponent (MnO or $Cr_2O_3$) are in such a relationship, effects of adding the MgO and MnO or $Cr_2O_3$ as the seventh subcomponent can be sufficiently enhanced.

When the (Mn+Cr)/Mg is out of the above range, the effect of adding MgO and the seventh subcomponent (MnO or $Cr_2O_3$) becomes insufficient and the high temperature accelerated lifetime declines. Note that the reason why the effects of adding them become insufficient is considered because MgO and the seventh subcomponent (MnO or $Cr_2O_3$) are segregated in the dielectric layer by adding $Al_2O_3$ as the eighth subcomponent.

On the other hand, in the second aspect, by controlling (Mn+Cr)/Mg to be in the above range, segregation of MgO and the seventh subcomponent is effectively prevented, the effects of adding MgO and the seventh subcomponent are fully brought out and particularly the high temperature accelerated lifetime is improved. Note that when $Cr_2O_3$ is not used as the seventh subcomponent, a Cr element is not substantially included in the dielectric ceramic composition. Therefore, in this case, (Mn+Cr)/Mg becomes substantially equal to Mn/Mg. Alternately, when MnO is not used, a Mn element is not substantially included in the dielectric ceramic composition. Therefore, in this case, (Mn+Cr)/Mg becomes substantially equal to Cr/Mg.

Ratios of the second to fifth subcomponents besides the first, seventh and eighth subcomponents may be the same as those in the first embodiment explained above. By including the second to fifth subcomponent, the X8R characteristics can be satisfied while maintaining a high permittivity.

Also, in the dielectric ceramic composition according to the second aspect, an R2 oxide (note that R2 is at least one kind selected from Y, Dy, Ho, Tb, Gd and Eu) is preferably included as a sixth subcomponent in accordance with need. The ratio of the sixth subcomponent may be the same as that in the first embodiment.

In the dielectric ceramic composition according to the second aspect, a predetermined amount of the eighth subcomponent including $Al_2O_3$ is added, and the ratio of the content of MgO included essentially in the first subcomponent and the content of the seventh subcomponent including MnO or $Cr_2O_3$ is in the predetermined range as above. Therefore, an effect of improving the high temperature accelerated lifetime is furthermore obtained in addition to the effects in the first embodiment explained above.

The internal electrode layer 3 and the external electrodes 4 may be configured in the same way as those in the first embodiment.

Also, a multilayer ceramic capacitor according to the second embodiment can be produced in the same method as that in the first embodiment.

Embodiments of the present invention were explained above, but the present invention is not limited to the embodiments and may be variously modified within the scope of the present invention.

For example, in the above embodiments, a multilayer ceramic capacitor was explained as an example of an electronic device according to the present invention, but an electronic device according to the present invention is not limited to the multilayer ceramic capacitor and may be any as far as it includes a dielectric layer composed of a dielectric ceramic composition having the above composition.

EXAMPLES

Next, the present invention will be explained further in detail by taking more specific examples of the embodiment of the present invention, but the present invention is not limited to the examples.

Example 1

Below, examples 1 and 2 and a comparative example 1 are examples according to the first aspect of the present invention.

First, as starting materials to produce a dielectric material, a main component material ($BaTiO_3$) having an average particle diameter of 0.1 to 1 μm and the first to eighth subcomponent materials were prepared.

Carbonates were used as a material of MgO and MnO (the first subcomponent: $MgCO_3$ and the seventh subcomponent: $MnCO_3$) and oxides were used for other materials (the second subcomponent: $(Ba_{0.6}Ca_{0.4})SiO_3$, the third subcomponent: $V_2O_5$, the fourth subcomponent: $Yb_2O_3$, the fifth subcomponent: $CaZrO_3$, the sixth subcomponent: $Y_2O_3$ and the eighth subcomponent: $Al_2O_3$). Note that $(Ba_{0.6}Ca_{0.4})SiO_3$, as the second subcomponent was produced by wet mixing $BaCO_3$, $CaCO_3$ and $SiO_2$ by a ball mill for 16 hours, drying, firing at 1150° C. in the air and furthermore wet mixing by a ball mill for 100 hours. Also, $CaZrO_3$ as the fifth subcomponent was produced by wet mixing $CaCO_3$ and $ZrO_3$ by a ball mill for 16 hours, drying, firing at 1150° C. in the air and furthermore wet mixing by a ball mill for 24 hours.

Note that as $BaTiO_3$ as the main component, the same results were obtained by using what produced by respectively weighing $BaCO_3$ and $TiO_2$, wet mixing by a ball mill for 16 hours, drying, firing at 1100° C. in the air and furthermore wet mixing by a ball mill for about 16 hours. Also, as $BaTiO_3$ as the main component, the same results were obtained by using what produced by hydrothermal synthesis powder and oxalate method, etc.

These materials were compounded, so that the composition after firing becomes as shown in Table 1 with respect to 100 moles of $BaTiO_3$ as the main component, wet mixed by a ball mill for 16 hours and dried to obtain a dielectric material.

Next, 100 parts by weight of the obtained dielectric material after drying, 4.8 parts by weight of an acrylic resin, 100 parts by weight of ethyl acetate, 6 parts by weight of mineral spirits, and 4 parts by weight of toluene were mixed by a ball mill to be a paste, so that a dielectric layer paste was obtained.

Next, 100 parts by weight of Ni particles having an average particle diameter of 0.2 to 0.8 μm, 40 parts by weight of an organic vehicle (obtained by dissolving 8 parts by weight of ethyl cellulose in 92 parts by weight of butyl carbitol) and 10 parts by weight of butyl carbitol were kneaded by a triple-roll to be a paste, so that an internal electrode layer paste was obtained.

Next, 100 parts by weight of Cu particle having an average particle diameter of 0.5 μm, 35 parts by weight of an organic vehicle (obtained by dissolving 8 parts by weight of ethyl cellulose in 92 parts by weight of butyl carbitol) and 7 parts by weight of butyl carbitol were kneaded to be a paste, so that an external electrode paste was obtained.

Next, a green sheet having a thickness of 4.5 μm was formed on a PET film by using the dielectric layer paste, the internal electrode layer paste was printed thereon, then, the green sheet was removed from the PET film. Next, the green sheets and protective green sheets (not printed with the internal electrode layer paste) were stacked and adhered with pressure to obtain a green chip. The number of stacked sheets having the internal electrode was 4.

Next, the green chip was cut to be a predetermined size and subjected to binder removal processing, firing and annealing, so that a multilayer ceramic fired body was obtained.

The binder removal processing was performed under a condition of a temperature raising rate of 15° C./hour, the holding temperature of 280° C. and the holding time of 8 hours in the air.

Firing was performed under a condition of the temperature raising rate of 200° C./hour, the holding temperature of 1280 to 1320° C., the holding time of 2 hours, the temperature cooling rate of 300° C./hour in an atmosphere of a wet mixed gas of $N_2+H_2$ (the oxygen partial pressure was $10^{-9}$ atm.).

Annealing was performed under a condition of the holding temperature of 900° C., the temperature holding time of 9 hours, the temperature cooling rate of 300° C./hour in a wet $N_2$ gas atmosphere (the oxygen partial pressure was $10^{-5}$ atm.). Note that a wetter, wherein the water temperature was 35° C., was used to wet the atmosphere gas at the time of firing and annealing.

Next, after end surfaces of the multilayer ceramic fired body was polished by sand blasting, the external electrode paste was transferred to the end surfaces and fired at 80° C. for 10 minutes in a wet $N_2+H_2$ atmosphere to form external electrodes, so that samples of a multilayer ceramic capacitor having the configuration shown in FIG. 1 were obtained.

Thus obtained samples had a size of 3.2 mm×1.6 mm×0.6 mm, the number of the dielectric layers-sandwiched by the internal electrode layers was 4 and the thickness was 3.5 μm, and a thickness of the internal electrode layer was 1.0 μm.

IR temperature dependency (a loss of significant digits), capacity-temperature characteristics (TC) and TC bias of the obtained capacitor samples were evaluated. The results are shown in Table 1.

The IR temperature dependency (a loss of significant digits) was evaluated by measuring insulation resistance $IR_{150}$ at 150° C. and insulation resistance $IR_{25}$ at 25° C. and calculating a loss of significant digits expressed by the formula 1 below. The evaluation criterion was that −2.00 or higher were determined preferable.

$$\log(IR_{150}/IR_{25}) \qquad (1)$$

Note that when measuring insulation resistance at respective temperatures, a temperature variable IR measuring device was used, and the measurement was made at a measurement voltage of 7.0 V/μm and voltage application time of 60 s.

The capacity-temperature characteristics (TC) were obtained by measuring capacitance of the obtained samples in a temperature range of −55 to 150° C. A digital LCR meter (4274A made by YHP) was used for measuring the capacitance, and the measurement was made under a condition of a frequency of 1 kHz and an input signal level of 1 Vrms. Then, a capacitance change rate (ΔC/C, the unit is %) was calculated under a temperature environment at 150° C., at which the capacity-temperature characteristics become the worst in the temperature range, whether the X8R characteristics (−55 to 150° C. and ΔC/C=within ±15%) were satisfied or not were examined, and those satisfying were indicated "G (good)" and those not satisfying were indicated "P (poor)".

The TC bias was measured on the obtained samples by a digital LCR meter (4274A made by YHP) at 1 kHz, 1 Vrms and a bias voltage (direct current voltage) of 7.0 V/μm by changing temperature from −55° C. to 150° C. and evaluated by a change rate of the capacitance calculated from the measurement value at the time of not applying a bias voltage at 25° C. Note that an LCR meter was used for measuring the capacitance, and the measurement was made under a condition of a frequency of 1 kHz and an input signal level of 1 Vrms. The evaluation criterion was that −40% or higher was determined preferable.

Note that a specific permittivity (ε), a dielectric loss (tan δ), IR lifetime under a direct current electric field, DC dielectric breakdown strength, and DC bias characteristics (dependency of permittivity at applying a direct current voltage) were also evaluated on the obtained capacitor samples.

The specific permittivity ε (no unit) was calculated from capacitance measured under a condition of the reference temperature of 25° C. by using a digital LCR meter (4274A made by YHP), a frequency of 1 kHz and an input signal level (measurement voltage) of 1.0 Vrms. As a result, all samples exhibited a preferable result of 1000 or higher.

The dielectric loss (tan δ) was measured on the capacitor samples under a condition of the reference temperature of 25° C. by using a digital LCR meter (4274A made by YHP), a frequency of 1 kHz and an input signal level (measurement voltage) of 1.0 Vrms. As a result, all samples exhibited a preferable result of 10% or lower.

The IR lifetime in the direct current electric field was obtained by conducting an acceleration test on the capacitor samples under an electric field of 10 V/μm at 200° C., and time until the insulation resistance becomes 1 MΩ or lower was calculated as the lifetime. As a result, all samples exhibited a preferable result of 10 hours or longer.

The DC dielectric breakdown strength of the capacitor samples was obtained by applying a direct current voltage at a temperature raising rate of 100 V/sec. and measuring a voltage (direct current breakdown voltage VB, the unit is V/μm) when a leakage current of 100 mA was detected, and the average value was calculated. As a result, all samples exhibited a preferable result of 100 V/μm or higher.

The DC bias characteristics was obtained by measuring a change of capacitance (ΔC/C) when gradually applying a direct current voltage to respective samples at a constant temperature (25° C.), and as a result of plotting, it was confirmed that the capacitance was hard to decrease even when a high voltage was applied and stable DC bias characteristics were obtained in all samples.

TABLE 1

| Sample No. | Eight Subcomponent Adding Quantity (Mole) | Temperature Change Rate (%) of Capacitance +150° C. | X8R Characteristics | TC Bias (%) | IR Temperature Dependency |
|---|---|---|---|---|---|
| 1* | 0 | −7.5 | G | −38.0 | −2.45 |
| 2 | 0.5 | −8.6 | G | −37.1 | −1.91 |
| 3 | 1 | −9.3 | G | −36.1 | −1.86 |
| 4 | 1.5 | −9.8 | G | −31.1 | −1.61 |
| 5 | 2 | −10.3 | G | −27.3 | −1.51 |
| 6 | 2.5 | −11.5 | G | −25.1 | −1.39 |
| 7 | 3 | −12.7 | G | −23.5 | −1.35 |
| 8 | 3.5 | −13.8 | G | −22.8 | −1.31 |
| 9* | 4 | −16.7 | P | −21.3 | −1.29 |

Samples with "*" indicate comparative examples.
Note that first subcomponent::$MgCO_3$ = 1.0 mole
second subcomponent: $(Ba_{0.6}, Ca_{0.4})SiO_3$ = 3.0 mole
third subcomponent: $V_2O_5$ = 0.1 mole
fourth subcomponent: $Yb_2O_3$ = 1.75 moles (3.5 moles in terms of Yb)
fifth subcomponent: $CaZrO_3$ = 1.5 moles
sixth subcomponent: $Y_2O_3$ = 2.0 moles (4.0 moels in terms of Y)
seventh subcomponent: $MnCO_3$ = 0.374 moles
eghth subcomponent: $Al_2O_3$, and the above adding quantities are with respect to 100 moles of the main component.

As shown in Table 1, when the content of the eighth subcomponent is too small, although the X8R characteristics are satisfied, a loss of significant digits of IR exceeds −2.00, the IR temperature dependency declines and, moreover, TC bias characteristics deteriorate. When the content of the eighth subcomponent is too much, although the IR temperature dependency improves, the X8R characteristics cannot be satisfied.

On the other hand, when the content of the eighth subcomponent was in the suitable range, it was confirmed that the X8R characteristics were satisfied, a loss of significant digits of IR became −2.00 or higher and the IR temperature dependency was improved.

Example 2

Other than changing the kind and content of the eighth subcomponent material to those shown in Table 2 to Table 5, capacitor samples were produced in the same way as in the example 1, and the same evaluations were made.

TABLE 2

| Sample No. | Eight Subcomponent Adding Quantity (Mole) | Temperature Change Rate (%) of Capacitance +150° C. | X8R Characteristics | TC Bias (%) | IR Temperature Dependency |
|---|---|---|---|---|---|
| 1* | 0 | −7.5 | G | −38.0 | −2.45 |
| 11 | 0.5 | −7.9 | G | −37.6 | −1.97 |
| 12 | 1 | −10.2 | G | −36.7 | −1.91 |
| 13 | 1.5 | −11.4 | G | −32.3 | −1.64 |
| 14 | 2 | −12.8 | G | −28.1 | −1.59 |
| 15 | 2.5 | −13.7 | G | −26.0 | −1.43 |
| 16 | 3 | −13.4 | G | −24.2 | −1.38 |
| 17 | 3.5 | −14.5 | G | −23.6 | −1.34 |
| 18* | 4 | −18.9 | P | −22.7 | −1.31 |

Samples with "*" indicate comparative examples.
Note that composition of the main component and compositions and adding quantities of first to seventh subcomponents are the same as those in Table 1.
eighth subcomponent: $Cr_2O_3$

TABLE 3

| Sample No. | Eight Subcomponent Adding Quantity (Mole) | Temperature Change Rate (%) of Capacitance +150° C. | X8R Characteristics | TC Bias (%) | IR Temperature Dependency |
|---|---|---|---|---|---|
| 1* | 0 | −7.5 | G | −38.0 | −2.45 |
| 20 | 0.5 | −8.0 | G | −37.5 | −1.95 |
| 21 | 1 | −9.6 | G | −36.1 | −1.90 |
| 22 | 1.5 | −10.6 | G | −32.1 | −1.70 |
| 23 | 2 | −11.2 | G | −27.8 | −1.55 |
| 24 | 2.5 | −12.4 | G | −25.4 | −1.40 |
| 25 | 3 | −13.4 | G | −23.7 | −1.32 |
| 26 | 3.5 | −14.5 | G | −23.1 | −1.36 |
| 27* | 4 | −17.9 | P | −22.1 | −1.31 |

Samples with "*" indicate comparative examples.
Note that composition of the main component and compositions and adding quantities of first to seventh subcomponents are the same as those in Table 1.
eighth subcomponent: $Ge_2O_2$

TABLE 4

| Sample No. | Eight Subcomponent Adding Quantity (Mole) | Temperature Change Rate (%) of Capacitance +150° C. | X8R Characteristics | TC Bias (%) | IR Temperature Dependency |
|---|---|---|---|---|---|
| 1* | 0 | −7.5 | G | −38.0 | −2.45 |
| 29 | 0.5 | −8.2 | G | −37.4 | −1.97 |
| 30 | 1 | −9.4 | G | −35.9 | −1.92 |
| 31 | 1.5 | −10.4 | G | −32.4 | −1.73 |
| 32 | 2 | −11.0 | G | −28.1 | −1.58 |
| 33 | 2.5 | −12.2 | G | −25.8 | −1.42 |
| 34 | 3 | −13.2 | G | −23.8 | −1.34 |
| 35 | 3.5 | −14.4 | G | −23.6 | −1.37 |
| 36* | 4 | −17.8 | P | −22.7 | −1.29 |

Samples with "*" indicate comparative examples.
Note that composition of the main component and compositions and adding quantities of first to seventh subcomponents are the same as those in Table 1.
eighth subcomponent: $Ga_2O_3$ As shown in Table 2 to Table 4, it is confirmed that even when the eighth subcomponent material is changed to $Cr_2O_3$, $Ge_2O_2$ and $Ga_2O_3$, the same effects as those in the case of $Al_2O_3$ in the example 1 are obtained.

TABLE 5

| Sample No. | Eight Subcomponent Al$_2$O$_3$ Adding Quantity (Mole) | Eight Subcomponent Cr$_2$O$_3$ Adding Quantity (Mole) | Temperature Change Rate (%) of Capacitance +150° C. | X8R Characteristics | TC Bias (%) | IR Temperature Dependency |
|---|---|---|---|---|---|---|
| 1* | 0 | 0 | −7.5 | G | −38.0 | −2.45 |
| 38 | 1 | 0.25 | −8.1 | G | −37.5 | −1.70 |
| 39 | 1 | 0.5 | −9.1 | G | −36.5 | −1.49 |
| 40 | 1 | 0.75 | −10.5 | G | −31.8 | −1.41 |
| 41 | 1 | 1 | −11.8 | G | −27.8 | −1.39 |
| 42 | 1 | 1.5 | −12.8 | G | −25.7 | −1.31 |
| 43 | 1 | 2 | −14.5 | G | −24.1 | −1.30 |
| 44* | 1 | 3 | −15.9 | P | −23.1 | −1.29 |
| 45* | 1 | 3.5 | −17.5 | P | −22.6 | −1.28 |

Samples with "*" indicate comparative examples.
Note that composition of the main component and compositions and adding quantities of first to seventh subcomponents are the same as those in Table 1.
eighth subcomponent: Al$_2$O$_3$ + Cr$_2$O$_3$ As shown in Table 5, even when the eighth subcomponent material is changed to a composite form of Al$_2$O$_3$ and Cr$_2$O$_3$, it is confirmed that the same effects as those in the case of adding Al$_2$O$_3$ alone can be obtained.

Comparative Example 1

Other than changing the kind and content of the eighth subcomponent material to those shown in Table 6, capacitor samples were produced in the same way as in the example 1 and the same evaluations were made.

TABLE 6

| Sample No. | Eight Subcomponent P$_2$O$_5$ Adding Quantity (Mole) | Eight Subcomponent K$_2$O Adding Quantity (Mole) | Temperature Change Rate (%) of Capacitance +150° C. | X8R Characteristics | TC Bias (%) | IR Temperature Dependency |
|---|---|---|---|---|---|---|
| 47* | 0.5 | — | −13.2 | G | −40.1 | −2.61 |
| 48* | 1 | — | −14.1 | G | −45.1 | −2.87 |
| 49* | 1.5 | — | −16.0 | P | −47.2 | −2.91 |
| 51* | — | 0.5 | −13.1 | G | −40.7 | −2.86 |
| 52* | — | 1 | −16.9 | P | −46.8 | −3.00 |

Samples with "*" indicate comparative examples.
Note that composition of the main component and compositions and adding quantities of first to seventh subcomponents are the same as those in Table 1.
eighth subcomponent: P$_2$O$_5$ or K$_2$O As shown in Table 6, when changing to cation elements P (0.052 nm) and K (0.152 nm), wherein an effective ionic radius at the time of 6 coordination was out of the suitable range, it was confirmed that the effect of adding the eighth subcomponent was not able to be obtained even if the content was in the suitable range.

Example 3

Below, examples 3 to 6 are examples according to the second aspect of the present invention.

First, as starting materials for producing a dielectric material, a main component material (BaTiO$_3$) having an average particle diameter of 0.1 to 1 μm and first to eighth subcomponent materials were prepared. Note that the same materials as those in the example 1 were used.

Next, the prepared materials were compounded, so that the composition after firing becomes those shown in Table 7 and Table 8 with respect to 100 moles of BaTiO$_3$ as the main component, wet mixed by a ball mill for 16 hours, and dried to be a dielectric material, so that a dielectric layer paste was obtained in the same way as that in the example 1.

Next, the above dielectric layer paste, an internal electrode layer paste and external electrode paste produced in the same way as those in the example 1 were used to obtain samples of a multilayer ceramic capacitor having the configuration shown in FIG. 1 in the same way as in the example 1.

The thus obtained samples had a size of 3.2 mm×1.6 mm×0.6 mm, the number of the dielectric layers sandwiched by the internal electrode layers was 4 and the thickness was 3.5 to 4.5 μm, and a thickness of the internal electrode layer was 1.0 μm.

IR temperature dependency (a loss of significant digits), high temperature accelerated lifetime, capacity-temperature characteristics (TC) and TC bias of the obtained capacitor samples were evaluated. The results are shown in Table 7 and Table 8.

IR temperature dependency (a loss of significant digits), capacity-temperature characteristics (TC) and TC bias were evaluated by the same methods as those in the example 1.

The high temperature accelerated lifetime (HALT) was evaluated by measuring an average lifetime by maintaining the obtained samples in a state of being applied with a direct current voltage of 10 V/μm at 200° C. In the present example, time from start of the application until the insulation resistance is reduced by one digit was defined as the lifetime. Also, the measurement of the high temperature accelerated lifetime was made on 10 capacitor samples. The evaluation criterion was that 20 hour or longer was determined preferable.

Note that when also evaluating a specific permittivity (ε), dielectric loss (tan δ), IR lifetime in a direct current electric field, direct current dielectric breakdown strength, and DC bias characteristics (dependency of permittivity applying direct current voltage) by the same methods as those in the example 1, the results described below were obtained.

Namely, the specific permittivity was 1000 or higher in all samples, which was preferable result.

The dielectric loss (tan δ) was 10% or lower in all samples, which was preferable result.

The direct current dielectric breakdown strength was 100 V/μm or more in all samples, which was preferable result.

The DC bias characteristics were hard to decrease even if a high voltage was applied in all samples and it was confirmed that stable DC bias characteristics were obtained.

TABLE 7

| Sample No. | MgO Adding Quantity (mole) | MnO Adding Quantity (mole) | Mn/Mg | Temperature Change Rate (%) of Capacitance +150° C. | X8R Characteristics | TC Bias (%) | IR Temperature Dependency | HALT (h) |
|---|---|---|---|---|---|---|---|---|
| 101* | 0.3 | 0.05 | 0.17 | −8.7 | G | −37.5 | −1.87 | 14 |
| 102 | 0.3 | 0.1 | 0.33 | −8.3 | G | −37.6 | −1.84 | 22 |
| 103 | 0.3 | 0.15 | 0.50 | −8.4 | G | −37.8 | −1.87 | 24 |
| 104* | 0.3 | 0.2 | 0.67 | −8.9 | G | −37.9 | −1.86 | 12 |
| 105* | 0.5 | 0.1 | 0.20 | −8.6 | G | −37.1 | −1.86 | 15 |
| 106 | 0.5 | 0.15 | 0.30 | −8.5 | G | −37.3 | −1.85 | 24 |
| 107 | 0.5 | 0.2 | 0.40 | −8.5 | G | −37.2 | −1.85 | 30 |
| 108* | 0.5 | 0.3 | 0.60 | −8.8 | G | −37.1 | −1.86 | 16 |
| 109* | 0.75 | 0.2 | 0.27 | −8.8 | G | −36.9 | −1.87 | 15 |
| 110 | 0.75 | 0.25 | 0.33 | −8.7 | G | −36.7 | −1.87 | 22 |
| 111 | 0.75 | 0.3 | 0.40 | −8.6 | G | −36.5 | −1.87 | 23 |
| 112* | 0.75 | 0.4 | 0.53 | −8.9 | G | −36.2 | −1.88 | 13 |

Samples with "*" indicate comparative examples.
Note that adding quantity of MnO is in terms of a Mn element,
second subcomponent: $(Ba_{0.6}, Ca_{0.4})SiO_3$ = 3.0 mole
third subcomponent: $V_2O_5$ = 0.1 mole
fourth subcomponent: $Yb_2O_3$ = 1.75 moles (3.5 moles in terms of Yb)
fifth subcomponent: $CaZrO_3$ = 1.5 moles
sixth subcomponent: $Y_2O_3$ = 2.0 moles (4.0 moels in terms of Y)
eghth subcomponent: $Al_2O_3$ = 1.0 mole, and the above adding quantities are with respect to 100 moles of the main component.

TABLE 8

| Sample No. | MgO Adding Quantity (mole) | MnO Adding Quantity (mole) | Mn/Mg | Temperature Change Rate (%) of Capacitance +150° C. | X8R Characteristics | TC Bias (%) | IR Temperature Dependency | HALT (h) |
|---|---|---|---|---|---|---|---|---|
| 101* | 0.3 | 0.2 | 0.67 | −8.9 | G | −37.5 | −1.86 | 12 |
| 106 | 0.5 | 0.2 | 0.40 | −8.5 | G | −37.3 | −1.85 | 30 |
| 113 | 0.6 | 0.2 | 0.33 | −8.6 | G | −37.6 | −1.86 | 31 |
| 114* | 0.8 | 0.2 | 0.25 | −8.7 | G | −37.8 | −1.87 | 9.5 |
| 105* | 0.5 | 0.3 | 0.60 | −8.8 | G | −37.2 | −1.86 | 16 |
| 115 | 0.6 | 0.3 | 0.50 | −8.7 | G | −38.0 | −1.86 | 21 |
| 110 | 0.75 | 0.3 | 0.40 | −8.6 | G | −37.9 | −1.87 | 23 |
| 116* | 0.8 | 0.3 | 0.38 | −8.6 | G | −37.3 | −1.87 | 16 |

Samples with "*" indicate comparative examples.
Note that adding quantity of MnO is in terms of a Mn element, and composition of the main component and compositions and adding quantities of second to sixth and eighth subcomponents are the same as those in Table 7.

In the Table 7 and Table 8, the first subcomponent and the seventh subcomponent were indicated not as carbonates ($MgCO_3$ and $MnCO_3$) used as the materials but in a state of oxides (MgO and MnO) included in the dielectric layer after firing (it will be the same in Table 9 to Table 11 below).

Samples shown in Table 7 were obtained by changing a mole ratio of a Mn element and Mg element (Mn/Mg) while fixing MgO to 0.3 mole, 0.5 mole and 0.75 mole, respectively, and adjusting an adding quantity of MnO. Also, samples shown in Table 8 were obtained by changing the mole ratio of a Mn element and Mg element (Mn/Mg) while fixing MnO to 0.2 mole and 0.3 mole, respectively, and adjusting an adding quantity of MgO. Note that the same sample numbers were given to samples having the same composition in Table 7 and Table 8.

As shown in Table 7, in samples 101 to 104, wherein MgO was 0.3 mole, the samples 102 and 103 having the mole ratio of a Mn element and Mg element (Mn/Mg) in a range of 0.3 to 0.5 satisfied the X8R characteristics, a loss of significant digits of IR became −2.00 or higher, the IR temperature dependency was improved and, moreover, the high temperature accelerated lifetime (HALT) became 20 hours, which were preferable results.

On the other hand, the samples 101 and 104 having the mole ratio of a Mn element and Mg element (Mn/Mg) of 0.17 and 0.67 being out of the range of the present invention exhibited preferable X8R characteristics and IR temperature dependency, but poor high temperature accelerated lifetime (HALT).

Also, the same results were obtained in the case that MgO was 0.5 mole (samples 105 to 108), the case that MgO was 0.75 mole (samples 109 to 112) and, furthermore, the case that MnO was fixed and MgO was changed (Table 9). Note that it is considered that the sample 116 in Table 9 exhibits a result of a poor high temperature accelerated lifetime (HALT) because the content of MgO is too much.

Figure 2A:
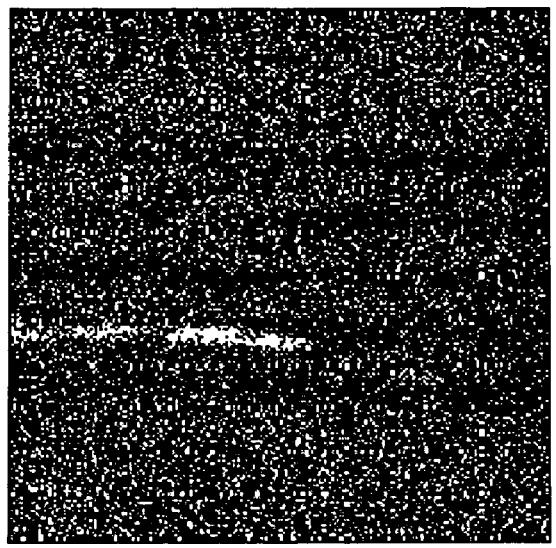
FIG. 2A is a picture showing a segregation state of a Mg element of a dielectric layer of an example according to the second aspect of the present invention.
Figure 2B:
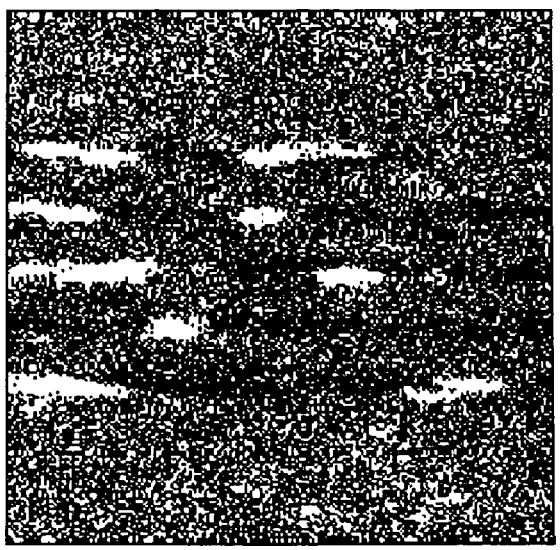
FIG. 2B is a picture showing a segregation state of a Mg element of a dielectric layer of a comparative example.
Figure 3A:
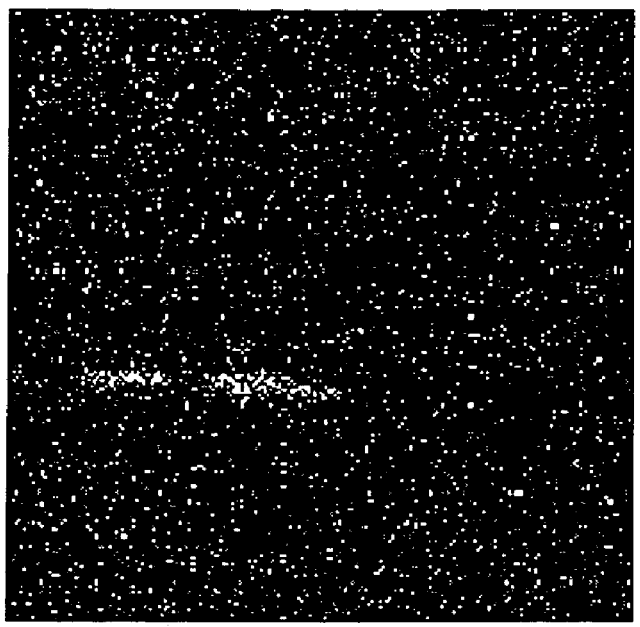
FIG. 3A is a picture showing a segregation state of a Mn element of a dielectric layer of an example according to the second aspect of the present invention.
Figure 3B:
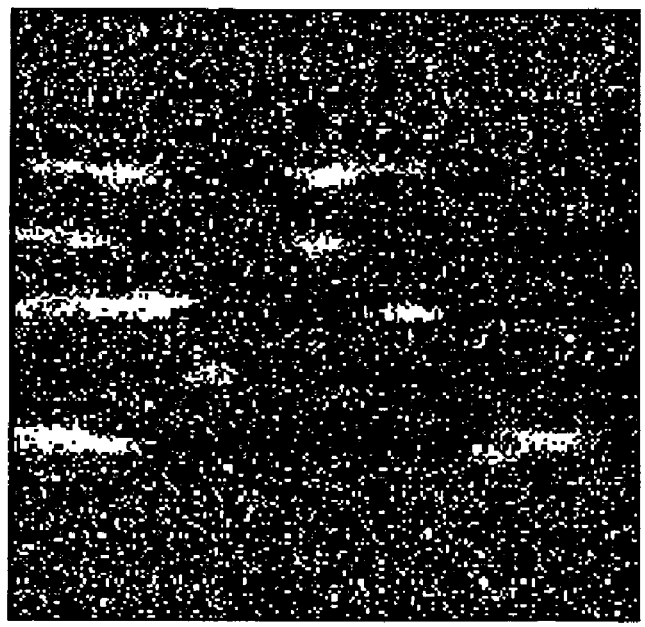
FIG. 3B is a picture showing a segregation state of a Mn element of a dielectric layer of a comparative example.

FIG. 2A and FIG. 3A show pictures showing segregation states of a Mg element (FIG. 2A) and Mn element (FIG. 3A) of the sample 111 as examples according to the second aspect of the present invention, and FIG. 2B and FIG. 3B show pictures showing segregation states of a Mg element (FIG. 2B) and Mn element (FIG. 3B) of the sample 112 as comparative examples, respectively. From these pictures, it is confirmed that segregation of the Mg element and Mn element exists much in the comparative examples. On the other hand, in the samples as examples according to the second aspect of the present invention, it is confirmed that the segregation is suppressed. Note that the pictures are obtained by performing an EPMA analysis.

Example 4

Other than using $Cr_2O_3$ instead of MnO as the seventh subcomponent, capacitor samples were produced in the same way as that in the samples 109 to 112 of the example 3, and the same evaluations were made.

TABLE 9

| Sample No. | MgO Adding Quantity (mole) | $Cr_2O_3$ Adding Quantity (mole) | Cr/Mg | Temperature Change Rate (%) of Capacitance +150° C. | X8R Characteristics | TC Bias (%) | IR Temperature Dependency | HALT (h) |
|---|---|---|---|---|---|---|---|---|
| 117* | 0.75 | 0.2  | 0.27 | −8.6 | G | −38.1 | −1.7  | 12 |
| 118  | 0.75 | 0.25 | 0.33 | −8.4 | G | −38.3 | −1.69 | 22 |
| 119  | 0.75 | 0.3  | 0.40 | −8.2 | G | −38.4 | −1.68 | 21 |
| 120* | 0.75 | 0.4  | 0.53 | −8.5 | G | −38.5 | −1.68 | 11 |

Samples with "*" indicate comparative examples.
Note that adding quantity of $Cr_2O_3$ is in terms of a Cr element, and composition of the main component and compositions and adding quantities of second to sixth and eighth subcomponents are the same as those in Table 7.

As shown in Table 9, it is confirmed that the same tendency as that in the case of using MnO was observed when using $Cr_2O_3$.

Example 5

Other than changing contents of MgO and MnO to those shown in Table 10, capacitor samples were produced in the same way as that in the example 3, and the same evaluations were made.

TABLE 10

| Sample No. | MgO Adding Quantity (mole) | MnO Adding Quantity (mole) | Mn/Mg | Temperature Change Rate (%) of Capacitance +150° C. | X8R Characteristics | TC Bias (%) | IR Temperature Dependency | HALT (h) |
|---|---|---|---|---|---|---|---|---|
| 121* | 0   | 0.2 | —    | −13.1 | G | −42.1 | −1.9  | 5  |
| 122* | 0.5 | 0   | 0.00 | The characteristics were unable to be measured, because of the dielectric layer to be semiconductive. | | | | |
| 123* | 1.5 | 0.6 | 0.40 | −9.6  | G | −35.2 | −1.96 | 10 |

Samples with "*" indicate comparative examples.
Note that adding quantity of MnO is in terms of a Mn-element, and composition of the main component and compositions and adding quantities of second to sixth and eighth subcomponents are the same as those in Table 7.

As shown in Table 10, from the result of the sample 121, it is confirmed that the high temperature accelerated lifetime (HALT) declines remarkably when MgO is not added. Also, from the result of the sample 122, when MnO was not added, the dielectric layer became semiconductive and evaluations were unable to be made on the samples.

Furthermore, from the result of the sample 123, when the contents of MgO and MnO are too much, it is confirmed that the high temperature accelerated lifetime (HALT) declines even when the mole ratio of the Mn element and Mg element (Mn/Mg) was 0.4.

Example 6

Other than changing a content of $Al_2O_3$ as the eighth subcomponent to what shown in Table 11, capacitor samples were produced in the same way as the sample 107 of the example 3, and the same evaluations were made.

TABLE 11

| Sample No. | MgO Adding Quantity (mole) | MnO Adding Quantity (mole) | Mn/Mg | $Al_2O_3$ Adding Quantity (mole) | Temperature ChangeRate (%) of Capacitance + 150° C. | X8R Characteristics | TC Bias (%) | IR Temperature Dependency | HALT (h) |
|---|---|---|---|---|---|---|---|---|---|
| 124* | 0.5 | 0.2 | 0.40 | 0 | −6.2 | G | −39.2 | −2.41 | 20 |
| 107  | 0.5 | 0.2 | 0.40 | 1 | −8.5 | G | −37.2 | −1.85 | 30 |
| 125  | 0.5 | 0.2 | 0.40 | 2 | −10.9 | G | −30.1 | −1.60 | 25 |
| 126  | 0.5 | 0.2 | 0.40 | 3 | −13.5 | G | −25.2 | −1.51 | 20 |
| 127* | 0.5 | 0.2 | 0.40 | 4 | −15.3 | p | −24.0 | −1.37 | 15 |

Samples with "*" indicate comparative examples.
Note that adding quantity of MnO is in terms of a Mn element, and composition of the main component and compositions and adding quantities of second to sixth subcomponents are the same as those in Table 7.

As shown in Table 11, it is confirmed that when $Al_2O_3$ is not added, the IR temperature dependency deteriorates, and when the content of $Al_2O_3$ is too much, the capacity-temperature characteristics deteriorate and the X8R characteristics cannot be satisfied.

What is claimed is:

1. A dielectric ceramic composition, comprising:
   a main component including barium titanate;
   a first subcomponent including at least one of MgO, CaO, BaO and SrO;
   a second subcomponent functioning as a sintering auxiliary agent;
   a third subcomponent including at least one of $V_2O_5$, $MoO_3$ and $WO_3$;
   a fourth subcomponent including an oxide of R1, where R1 is one of more elements each selected from a group consisting of Sc, Er, Tm, Yb, and Lu;
   a fifth subcomponent including $CaZrO_3$ or $CaO+ZrO_2$; and
   an eighth subcomponent including an oxide of A, wherein A is one or more elements each selected from a cation element group consisting of Al, Cr, Ga, and Ge, where each of the elements has an effective ionic radius at the time of 6 coordination of 0.065 nm to 0.085 nm; and
   a ratio of said eighth subcomponent with respect to 100 moles of said main component is greater than 1 mole and less than 4 moles.

2. The dielectric ceramic composition as set forth in claim 1, wherein ratios of respective subcomponents with respect to 100 moles of said main component are
   the first subcomponent: 0.1 to 3 moles,
   the second subcomponent: 2 to 10 moles,
   the third subcomponent: 0.01 to 0.5 mole,
   R1 of the fourth subcomponent: 0.5 to 7 moles, and
   the fifth subcomponent: 0<fifth subcomponent≦5 moles.

3. The dielectric ceramic composition as set forth in claim 1, furthermore comprising an oxide of R2 as a sixth subcomponent, wherein
   R2 is one or more elements each selected from a group consisting of Y, Dy, Ho, Tb, Gd, and Eu; and
   a content of R2 of the sixth subcomponent is 9 moles or less with respect to 100 moles of the main component including barium titanate.

4. The dielectric ceramic composition as set forth in claim 3, wherein a combined content of R1 of the fourth subcomponent and R2 of the sixth subcomponent is 13 moles or less with respect to 100 moles of the main component including barium titanate.

5. The dielectric ceramic composition as set forth in claim 1, wherein said second subcomponent is expressed by at least an agent selected from a group consisting of $SiO_2$, $Li_2O$, $B_2O_2$ and MO, where M is at least one element selected from a group consisting of Ba, Ca, Sr, and Mg.

6. The dielectric ceramic composition as set forth in claim 1, furthermore comprising MnO as a seventh subcomponent, wherein a content of said seventh subcomponent is 0.5 mole or smaller with respect to 100 moles of the main component including barium titanate.

7. A dielectric ceramic composition, comprising:
   a main component including barium titanate;
   a first subcomponent including MgO;
   a second subcomponent functioning as a sintering auxiliary agent;
   a third subcomponent including at least one of $V_2O_5$, $MoO_3$ and $WO_3$;
   a fourth subcomponent including an oxide of R1, where R1 is one or more elements each selected from a group consisting of Sc, Er, Tm, Yb, and Lu;
   a fifth subcomponent including $CaZrO_3$ or $CaO+ZrO_2$;
   a seventh subcomponent including MnO or $Cr_2O_3$; and
   an eighth subcomponent including $Al_2O_3$,
   wherein ratios of said first subcomponent, seventh subcomponent and eighth subcomponent with respect to 100 moles of said main component are
   the first subcomponent: 0.2 to 0.75 mole,
   a Mn element or Cr element of the seventh subcomponent: 0.1 to 0.3 mole, and
   the eighth subcomponent: from 0.5 mole to 4 moles but not including 4 moles; and
   a Mg element included in said first subcomponent and the Mn element and Cr element included in said seventh subcomponent are in a relationship of $0.3≦(Mn+Cr)/Mg≦0.5$ in a mole ratio.

8. The dielectric ceramic composition as set forth in claim 7, wherein:
   ratios of said second to fifth subcomponents with respect to 100 moles of said main component are
   the second subcomponent: 2 to 10 moles,
   the third subcomponent: 0.01 to 0.5 mole,
   R1 of the fourth subcomponent: 0.5 to 7 moles, and
   the fifth subcomponent: 0<fifth subcomponent≦5.

9. The dielectric ceramic-composition as set forth in claim 7, furthermore comprising an oxide of R2 as a sixth subcomponent, wherein
   R2 is one or more elements selected from a group consisting of Y, Dy, Ho, Tb, Gd and Eu; and
   a content of R2 of the sixth subcomponent is 9 moles or less with respect to 100 moles of the main component including barium titanate.

10. The dielectric ceramic composition as set forth in claim 9, wherein a combined content of R1 of the fourth subcomponent and R2 of the sixth subcomponent is 13 moles or less with respect to 100 moles of the main component including barium titanate.

11. The dielectric ceramic composition as set forth in claim 7, wherein said first subcomponent furthermore includes one or more of CaO, BaG and SrO.

12. The dielectric ceramic composition as set forth in claim 7, wherein said second subcomponent is expressed by at least an agent selected from a group consisting of $SiO_2$, $Li_2O$, $B_2O_3$, and MO, where M is at least one element selected from a group consisting of Ba, Ca, Sr, and Mg.

13. An electronic device comprising a dielectric layer composed of a dielectric ceramic composition, wherein:
said dielectric ceramic composition comprises
a main component including barium titanate;
a first subcomponent including at least one of MgO, CaO, BaO and SrO;
a second subcomponent functioning as a sintering auxiliary agent;
a third subcomponent including at least one of $V_2O_5$, $MoO_3$ and $WO_3$;
a fourth subcomponent including an oxide of R1, where R1 is one or more elements each selected from a group consisting of Sc, Er, Tm, Yb, and Lu;
a fifth subcomponent including $CaZrO_3$ or $CaO+ZrO_2$; and
an eighth subcomponent including an oxide of A, wherein
A is one or more elements each selected from a cation element group consisting of Al, Cr, Ga, and Ge, where each of the elements has an effective ionic radius at the time of 6 coordination of 0.065 nm to 0.085 nm, and
a ratio of said eighth subcomponent with respect to 100 moles of said main component is greater than 1 mole and less than 4 moles.

14. A multilayer ceramic capacitor having a capacitor element body, wherein dielectric layers composed of a dielectric ceramic composition and internal electrode layers are alternately stacked, wherein:
said dielectric ceramic composition comprises
a main component including barium titanate;
a first subcomponent including at least one of MgO, CaO, BaO and SrO;
a second subcomponent functioning as a sintering auxiliary agent;
a third subcomponent including at least one of $V_2O_5$, $MoO_3$ and $WO_3$;
a fourth subcomponent including an oxide of R1, where R1 is one or more elements each selected from a group consisting of Sc, Er, Tm, Yb, and Lu;
a fifth subcomponent including $CaZrO_3$ or $CaO+ZrO_2$; and
an eighth subcomponent including an oxide of A, wherein A is one or more elements each selected from a cation element group consisting of Al, Cr, Ga, and Ge;
a ratio of said eighth subcomponent with respect to 100 moles of said main component is greater than 1 mole and less than 4 moles.

15. The multilayer ceramic capacitor as set forth in claim 14, wherein:
in said dielectric ceramic composition, ratios of respective subcomponents with respect to 100 moles of said main component are
the first subcomponent: 0.1 to 3 moles,
the second subcomponent: 2 to 10 moles,
the third subcomponent: 0.01 to 0.5 mole,
R1 of the fourth subcomponent: 0.5 to 7 moles, and
the fifth subcomponent: 0<fifth subcomponent≦5.

16. The multilayer ceramic capacitor as set forth in claim 15, wherein:
in said dielectric ceramic composition furthermore comprises an oxide of R2 as a sixth subcomponent, and MnO as a seventh subcomponent;
wherein
R2 is one or more elements each selected from a group consisting of Y, Dy, Ho, Tb, Gd, and Eu;
a content of R2 of the sixth subcomponent is 9 moles or less with respect to 100 moles of the main component including barium titanate; and
a content of said seventh subcomponent is 0.5 mole or less with respect to 100 moles of the main component including barium titanate.

17. An electronic device comprising a dielectric layer composed of a dielectric ceramic composition, wherein:
said dielectric ceramic composition comprises
a main component including barium titanate;
a first subcomponent including MgO;
a second subcomponent functioning as a sintering auxiliary agent;
a third subcomponent including at least one of $V_2O_5$, $MoO_3$ and $WO_3$;
a fourth subcomponent including an oxide of R1, where R1 is one or more elements each selected from the group consisting of Sc, Er, Tm, Yb, and Lu;
a fifth subcomponent including $CaZrO_3$ or $CaO+ZrO_2$;
a seventh subcomponent including MnO or $Cr_2O_3$; and
an eighth subcomponent including an oxide of Al,
wherein ratios of said first subcomponent, seventh subcomponent and eighth subcomponent with respect to 100 moles of said main component are
the first subcomponent: 0.2 to 0.75 mole,
a Mn element or Cr element of the seventh subcomponent: 0.1 to 0.3 mole, and
the eighth subcomponent: from 0.5 mole to 4 moles but not including 4 moles; and
a Mg element included in said first subcomponent and the Mn element and Cr element included in said seventh subcomponent are in a relationship of 0.3≦(Mn+Cr)/Mg≦0.5 in a mole ratio.

18. A multilayer ceramic capacitor having a capacitor element body, wherein dielectric layers composed of a dielectric ceramic composition and internal electrode layers are alternately stacked, wherein:
said dielectric ceramic composition comprises
a main component including barium titanate;
a first subcomponent including MgO;
a second subcomponent functioning as a sintering auxiliary agent;
a third subcomponent including at least one of $V_2O_5$, $MoO_3$ and $WO_3$;
a fourth subcomponent including an oxide of R1, where R1 is one or more elements each selected from a group consisting of Sc, Er, Tm, Yb, and Lu;
a fifth subcomponent including $CaZrO_3$ or $CaO+ZrO_2$;
a seventh subcomponent including MnO or Cr2O3; and
an eighth subcomponent including an oxide of Al,
wherein ratios of said first subcomponent, seventh subcomponent and eighth subcomponent with respect to 100 moles of said main component are
the first subcomponent: 0.2 to 0.75 mole,
a Mn element or Cr element of the seventh subcomponent: 0.1 to 0.3 mole, and the eighth subcomponent: from 0.5 mole to 4 moles but not including 4 moles; and a Mg element included in said first subcomponent and the Mn element and Cr element included in said seventh subcomponent are in a relationship of $0.3 \leq (Mn+Cr)/Mg \leq 0.5$ in a mole ratio.

19. The multilayer ceramic capacitor as set forth in claim 18, wherein:

in the dielectric ceramic composition, ratios of said second to fifth subcomponents with respect to 100 moles of said main component are the second subcomponent: 2 to 10 moles, the third subcomponent: 0.01 to 0.5 mole, R1 of the fourth subcomponent: 0.5 to 7 moles, and the fifth subcomponent: $0 \leq$ fifth subcomponent $\leq 5$.

20. The multilayer ceramic capacitor as set forth in claim 19, wherein:

in said dielectric ceramic composition furthermore comprises an oxide of R2 as a sixth subcomponent, wherein R2 is at least one of Y, Dy, Ho, Tb, Gd, and Eu; and a content of R2 of the sixth subcomponent is 9 moles or less with respect to 100 moles of the main component including barium titanate.

* * * * *